United States Patent
Knopf et al.

(10) Patent No.: US 9,904,333 B2
(45) Date of Patent: Feb. 27, 2018

(54) SSD (SOLID STATE DRIVE) RELATED FEATURES OF A PORTABLE COMPUTER

(71) Applicant: Apple Inc., Cupertino, CA (US)

(72) Inventors: Eric A. Knopf, Mountain View, CA (US); Bartley K. Andre, Menlo Park, CA (US); Matthew P. Casebolt, Fremont, CA (US); Houtan R. Farahani, San Ramon, CA (US); William F. Leggett, San Francisco, CA (US); Gavin J. Reid, Campbell, CA (US); Mikael M. Silvanto, San Francisco, CA (US); Derek J. Yap, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/866,922

(22) Filed: Apr. 19, 2013

(65) Prior Publication Data
US 2014/0111933 A1 Apr. 24, 2014

Related U.S. Application Data

(60) Provisional application No. 61/715,832, filed on Oct. 18, 2012.

(51) Int. Cl.
| | |
|---|---|
| *G06F 1/18* | (2006.01) |
| *G06F 1/20* | (2006.01) |
| *G06F 1/16* | (2006.01) |
| *G11B 33/08* | (2006.01) |
| *G11B 33/12* | (2006.01) |

(52) U.S. Cl.
CPC .............. *G06F 1/203* (2013.01); *G06F 1/1658* (2013.01); *G06F 1/187* (2013.01); *G06F 1/20* (2013.01); *G11B 33/08* (2013.01); *G11B 33/124* (2013.01)

(58) Field of Classification Search
CPC ... G06F 1/16; G06F 1/18; G06F 1/203; G06F 1/187; G06F 1/20; G06F 1/1658; G11B 33/124; G11B 33/08
USPC ....................................... 361/679.33–679.37
See application file for complete search history.

(56) References Cited

U.S. PATENT DOCUMENTS

| | | | |
|---|---|---|---|
| 5,995,365 A * | 11/1999 | Broder ................. | G11B 33/124 361/679.31 |
| 6,351,379 B1 * | 2/2002 | Cheng ................. | G11B 33/128 312/332.1 |
| 6,386,656 B1 * | 5/2002 | Chen ...................... | G06F 1/184 312/223.2 |
| 6,532,152 B1 | 3/2003 | White et al. | |
| 6,556,432 B2 * | 4/2003 | Chen ...................... | G06F 1/184 312/223.1 |

(Continued)

*Primary Examiner* — Tuan T Dinh
*Assistant Examiner* — Rockshana Chowdhury
(74) *Attorney, Agent, or Firm* — Downey Brand LLP

(57) ABSTRACT

A removable assembly for quickly inserting and removing a mass storage device from a compartment situated on the case of a portable computing device is described. The removable assembly is made of a mass storage device, a bracket which serves as a carrier for the mass storage device, and a metal plate. In some embodiments, the mass storage device is a solid state drive (SSD) card. The bracket is a single-piece plastic structure that is deflected for snap insertion into the compartment and snap removal from the compartment. The metal plate conducts heat from the solid state drive (SSD) card to prevent the SSD from overheating.

20 Claims, 26 Drawing Sheets

(56) References Cited

U.S. PATENT DOCUMENTS

| | | | |
|---|---|---|---|
| 6,728,105 B2 | 4/2004 | Tanaka | |
| 6,839,228 B2 * | 1/2005 | Choi | G06F 1/1616 |
| | | | 312/223.2 |
| 7,369,405 B2 * | 5/2008 | Chen | G06F 1/181 |
| | | | 165/104.33 |
| 7,423,869 B2 * | 9/2008 | Su | G06F 1/187 |
| | | | 312/223.2 |
| 7,453,691 B2 * | 11/2008 | Zhao | G06F 1/187 |
| | | | 180/338 |
| 7,768,785 B2 | 8/2010 | Ni et al. | |
| 7,903,418 B2 | 3/2011 | Tracy et al. | |
| 8,373,980 B2 | 2/2013 | Reber | |
| 2007/0047198 A1 * | 3/2007 | Crooijmans | G06F 1/1632 |
| | | | 361/679.41 |
| 2007/0211425 A1 * | 9/2007 | Zhao et al. | 361/685 |
| 2008/0158810 A1 * | 7/2008 | Liu | G06F 1/187 |
| | | | 361/679.33 |
| 2010/0091444 A1 * | 4/2010 | Reid et al. | 361/679.37 |
| 2010/0172086 A1 * | 7/2010 | Chen | G11B 33/128 |
| | | | 361/679.33 |
| 2011/0019356 A1 * | 1/2011 | Moriai | G06F 1/20 |
| | | | 361/679.32 |
| 2011/0164379 A1 * | 7/2011 | Wang | G06F 1/1658 |
| | | | 361/679.58 |

* cited by examiner

SSD (SOLID STATE DRIVE) RELATED FEATURES OF A PORTABLE COMPUTER

CROSS REFERENCE TO RELATED APPLICATIONS

This U.S. Patent Application claims priority under 35 USC 119(e) to U.S. Provisional Patent Application No. 61/715,832 filed Oct. 18, 2012 entitled "SSD (Solid State Drive) Related Features of a Portable Computer" by Knopf et al. which is incorporated by reference in its entirety for all purposes.

TECHNICAL FIELD

The present disclosure relates generally to a mass storage device, and more particularly to a solid state drive affixed to a removable bracket and related portable computing device and method.

BACKGROUND

Mass storage devices are employed in many portable computing devices to store data therein. In the continuing pursuit to improve portable computing devices, manufacturers have attempted to produce portable computing devices having smaller dimensions. In this pursuit, the space allocated for each of the various components therein has been reduced in order to reduce the overall size of the portable computing device.

However, reduction of the space allocated to the mass storage device has presented challenges. In this regard, mass storage devices may fail or temporarily operate improperly when subjected to forces during impacts that exceed a certain level. Accordingly, mass storage devices may be mounted in portable computing devices in manners configured to lessen the forces thereon when subjected to impact. For example, isolators (rubber bushings) have been employed to mount mass storage devices in portable computing devices. However, embodiments of isolator mounts may use a relatively large amount of space, which may make it difficult to reduce the size of the portable computing device.

Additionally, there is also a desire for a mechanism that would allow for quick and easy replacement of mass storage devices mounted in portable computing devices. Ideally, this mechanism would result in a secure and stable mounting of the mass storage device in the portable computing device, and yet not require the use of tools for its removal from the portable computing device. Such a mechanism might also help to streamline and simplify the manufacturing process.

Accordingly, improved apparatuses, portable computing devices, and methods for mounting mass storage devices may be desirable.

SUMMARY

A mounting arrangement for a mass storage device such as a hard drive device or a solid state memory device such as flash memory is provided. The mounting arrangement can include a removable assembly for quickly inserting and removing a mass storage device from a compartment situated on the case of a portable computing device. The removable assembly is made of a mass storage device, a bracket which serves as a carrier for the mass storage device, and a metal plate. The mass storage device can be a solid state drive (SSD) card. The bracket is a single-piece plastic structure that can be deflected for snap insertion into the compartment and snap removal from the compartment. The metal plate conducts heat from the solid state drive (SSD) card to prevent it from overheating.

An assembly for mounting a mass storage device in a compartment formed in a case of a portable computing device is disclosed. The assembly includes a single-piece bracket comprising of a plurality of edge surfaces defining a first structure for retention within the compartment defined by a major wall and a plurality of side walls of the case of the portable computing device and a second structure for snap insertion into and snap removal from the compartment. The assembly further includes a mass storage device attached to the single-piece bracket.

A portable computing device including a case, a mass storage device, a bracket and a metal plate is disclosed. The case includes a major wall and a plurality of side walls that define a compartment. The mass storage device includes a solid state memory device including a supporting substrate. The bracket is configured to hold in place the mass storage device within the compartment located inside the portable computing device. The bracket can be snapped in place for retention within the compartment and removed from the compartment. The bracket structure has an opening to accommodate a connector to the mass storage device. The metal plate is attached to the bracket for supporting the mass storage device and heat sinking the mass storage device.

A removable assembly for mounting a mass storage device in a compartment formed in a case of a portable computing device is disclosed. The removable assembly includes a single-piece bracket, a mass storage device, and a metal plate. The single-piece bracket includes a plurality of edge surfaces defining a first structure for retention within the compartment defined by a major wall and a plurality of side walls of the case of the portable computing device and a second structure for snap insertion into and snap removal from the compartment. The mass storage device is attached to the single-piece bracket. The metal plate is attached to the bracket for supporting the mass storage device and heat sinking the mass storage device.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, assemblies, methods, and systems. These drawings in no way limit any changes in form and detail that may be made to the disclosure by one skilled in the art without departing from the spirit and scope of the disclosure.

DETAILED DESCRIPTION

Figure 1:
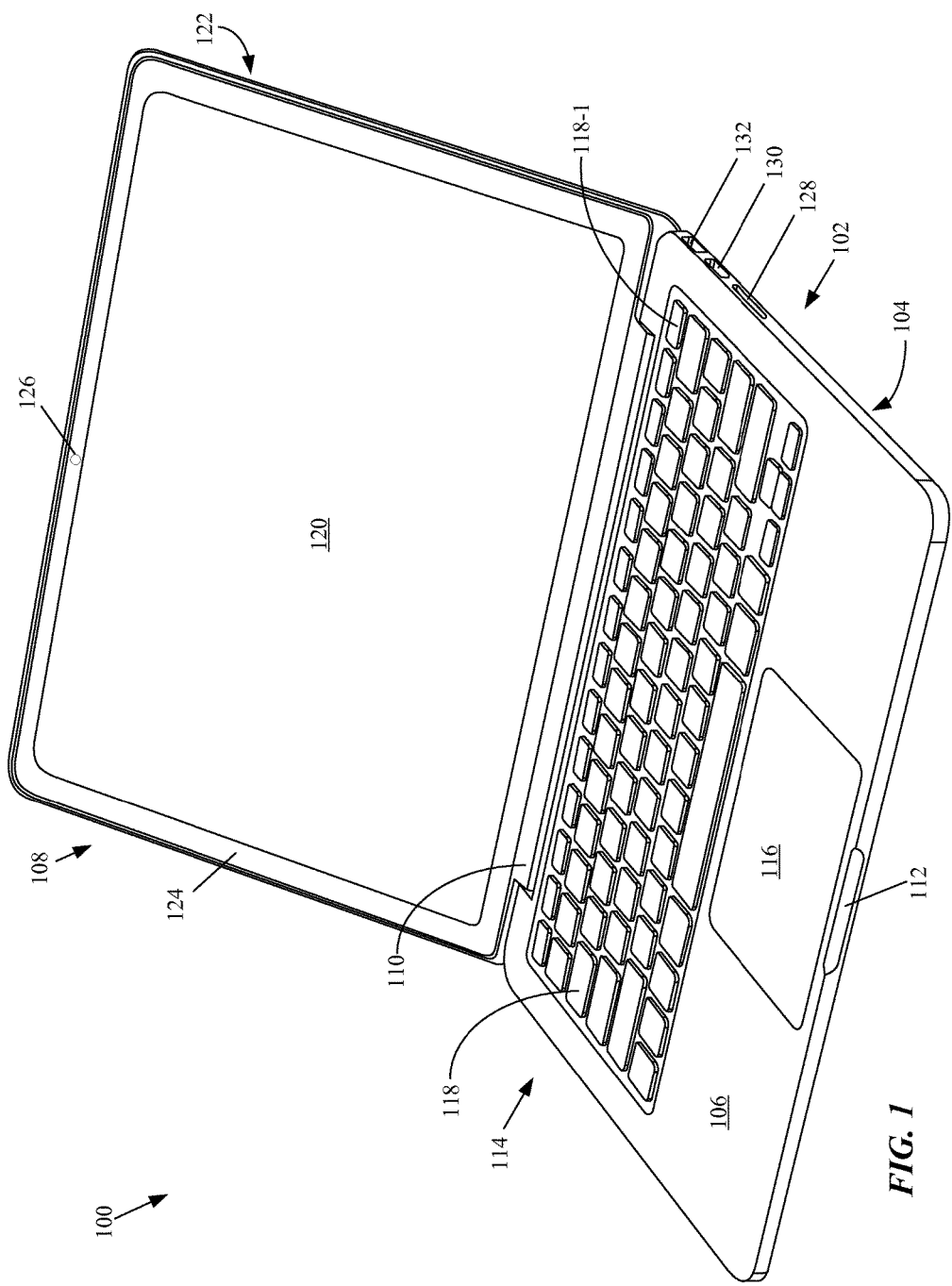
FIG. 1 shows a front facing perspective view of an embodiment of the portable computing device in the form of portable computing device in an open (lid) state according to an example embodiment of the present disclosure.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The top case and the bottom case can each be joined in a particular manner at an interface region such that the gap and offset between top and bottom cases are not only reduced, but are also more consistent from device to device during the mass production of devices. These general subjects are set forth in greater detail below.

In a particular embodiment, the lid and base portion can be pivotally connected with each other by way of what can be referred to as a clutch assembly. The clutch assembly can be arranged to pivotally couple the base portion to the lid.

The clutch assembly can include at least a cylindrical portion that in turn includes an annular outer region, and a central bore region surrounded by the annular outer region, the central bore suitably arranged to provide support for electrical conductors between the base portion and electrical components in the lid. The clutch assembly can also include a plurality of fastening regions that couple the clutch to the base portion and the lid of the portable computing device with at least one of the fastening regions being integrally formed with the cylindrical portion such that space, size and part count are minimized.

The top case can include a cavity, or lumen, into which a plurality of operational components can be inserted during an assembly operation. In the described embodiment, the operational components can inserted into the lumen and attached to the top case in an "top-bottom" assembly operation in which top most components are inserted first followed by components in a top down arrangement. For example, the top case can be provided and shaped to accommodate a keyboard module. The keyboard module can include a keyboard assembly formed of a plurality of keycap assemblies and associated circuitry, such as a flexible membrane on which can be incorporated a switching matrix and protective feature plate. Therefore, following the top-bottom assembly approach, the keyboard assembly is first inserted into the top case followed by the flexible membrane and then the feature plate that is attached to the top case. Other internal components can then be inserted in a top to bottom (when viewed from the perspective of the finished product) manner.

In one embodiment, the keyboard module can be configured in such a way that a keycap assembly can be used to replace a power switch. For example, in a conventional keyboard each of a top row of keycaps can be assigned at least one function. However, by re-deploying one of the keycaps as a power button, the number of operational components can be reduced by at least eliminating the switch mechanism associated with the conventional power button and replacing it with the already available keycap assembly and associated circuitry.

In addition to the keyboard, the portable computing device can include a touch sensitive device along the lines of a touch pad, touch screen, etc. In those embodiments where the portable computing device includes a touch pad the touch pad can be formed from a glass material. The glass material provides a cosmetic surface and is the primary source of structural rigidity for the touchpad. The use of the glass material in this way significantly reduces the overall thickness of the touchpad compared to previous designs. The touchpad can include circuitry for processing signals from a sensor associated with the touchpad. In one embodiment, the circuitry can be embodied as a printed circuit board (PCB). The PCB can be formed of material and placed in such a way that provides structural support for the touchpad. Thus, a separate touchpad support is eliminated.

In one embodiment, the top case can be formed from a single billet of aluminum that is machined into a desired shape and size. The top case can include an integrated support system that adds to the structural integrity of the top case. The integrated support system can be continuous in nature in that there are no gaps or breaks. The integrated support system can be used to provide support for individual components (such as a keyboard). For example, the integrated support system can take the form of ribs that can be used as a reference datum for a keyboard. The ribs can also provide additional structural support due to the added thickness of the ribs. The ribs can also be used as part of a shield that help to prevent light leaking from the keyboard as well as act as a Faraday cage that prevents leakage of extraneous electromagnetic radiation.

The continuous nature of the integrated support system can result in a more even distribution of an external load applied to the multi-part housing resulting in a reduced likelihood of warping, or bowing that reduces risk to internal components. The integrated support system can also provide mounting structures for those internal components mounted to the multi-part housing. Such internal components include a mass storage device (that can take the form of a hard disk drive, HDD, or solid state drive, SSD), audio components (audio jack, microphone, speakers, etc.) as well as input/output devices such as a keyboard and touch pad.

These and other embodiments are discussed below with reference to FIGS. 1-26. However, those skilled in the art will readily appreciate that the detailed description given herein with respect to these figures is for explanatory purposes as the invention extends beyond these limited embodiments.

FIGS. 1-26 show various views of the portable computing device in accordance with various embodiments. FIG. 1 shows a front facing perspective view of an embodiment of the portable computing device in the form of portable computing device 100 in an open (lid) state. Portable computing device 100 can include base portion 102 formed of bottom case 104 fastened to top case 106. Base portion 102 can be pivotally connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid portion 108 by, for example, a finger. Top case 106 can be configured to accommodate various user input devices such as keyboard 114 and touchpad (or trackpad) 116. Keyboard 114 can include a plurality of low profile keycap assemblies each having an associated key pad 118. In one embodiment, an audio transducer (not shown) can use selected portions of keyboard 114 to output audio signals such as music.

Each of the plurality of key pads 118 can have a symbol imprinted thereon for identifying the key input associated with the particular key pad. Keyboard 114 can be arranged to receive a discrete input at each keypad using a finger motion referred to as a keystroke. In the described embodiment, the symbols on each key pad can be laser etched thereby creating an extremely clean and durable imprint that will not fade under the constant application of keystrokes over the life of portable computing device 100. In order to reduce component count, a keycap assembly can be re-provisioned as a power button. For example, key pad 118-1 can be used as power button 118-1. In this way, the overall number of components in portable computing device 100 can be commensurably reduced.

Touchpad 116 can be configured to receive finger gesturing. A finger gesture can include touch events from more than one finger applied in unison. The gesture can also include a single finger touch event such as a swipe or a tap. The gesture can be sensed by a sensing circuit in touchpad 116 and converted to electrical signals that are passed to a processing unit for evaluation. In this way, portable computing device 100 can be at least partially controlled by touch.

Lid portion 108 can be moved with the aid of clutch assembly 110 from the closed position to remain in the open position and back again. Lid portion 108 can include display 120 and rear cover 122 (shown more clearly in FIG. 2) that can add a cosmetic finish to lid portion 108 and also provide structural support to at least display 120. In the described embodiment, lid portion 108 can include mask (also referred to as display trim) 124 that surrounds display 120. Display trim 124 can be formed of an opaque material such as ink deposited on top of or within a protective layer of display 120. Display trim 124 can enhance the overall appearance of display 120 by hiding operational and structural components as well as focusing attention onto the active area of display 120.

Display 120 can display visual content such as a graphical user interface, still images such as photos as well as video media items such as movies. Display 120 can display images using any appropriate technology such as a liquid crystal display (LCD), OLED, etc. Portable computing device 100 can also include image capture device 126 located on a transparent portion of display trim 124. Image capture device 126 can be configured to capture both still and video images. Lid portion 108 can be formed to have uni-body construction that can provide additional strength and resiliency to lid portion 108 which is particularly important due to the stresses caused by repeated opening and closing. In addition to the increase in strength and resiliency, the uni-body construction of lid portion 108 can reduce overall part count by eliminating separate support features.

Data ports 128-132 can be used to transfer data and/or power between an external circuit(s) and portable computing device 100. Data ports 128-132 can include, for example, input slot 128 that can be used to accept a memory card (such as a FLASH memory card), data ports 130 and 132 can take be used to accommodate data connections such as USB, FireWire, Thunderbolt, and so on.

Figure 2:
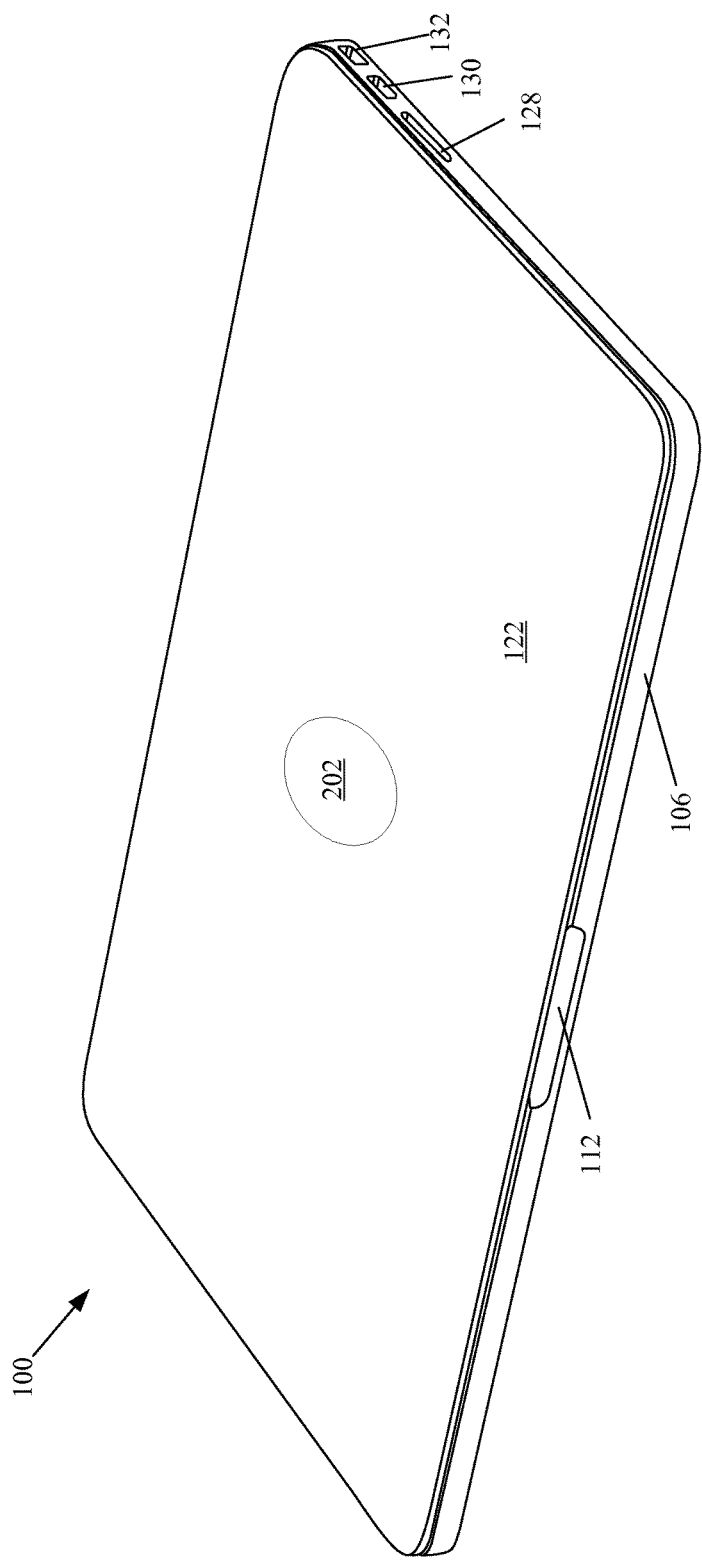
FIG. 2 shows the portable computing device of FIG. 1 in a closed (lid) configuration that shows rear cover and logo according to an example embodiment of the present disclosure.

FIG. 2 shows the portable computing device 100 in a closed (lid) configuration that shows rear cover 122 and logo 202. In one embodiment, logo 202 can be illuminated by light from display 120. It should be noted that in the closed configuration, lid portion 108 and base portion 102 form what appears to be a uniform structure having a continuously varying and coherent shape that enhances both the look and feel of portable computing device 100.

Figure 3:
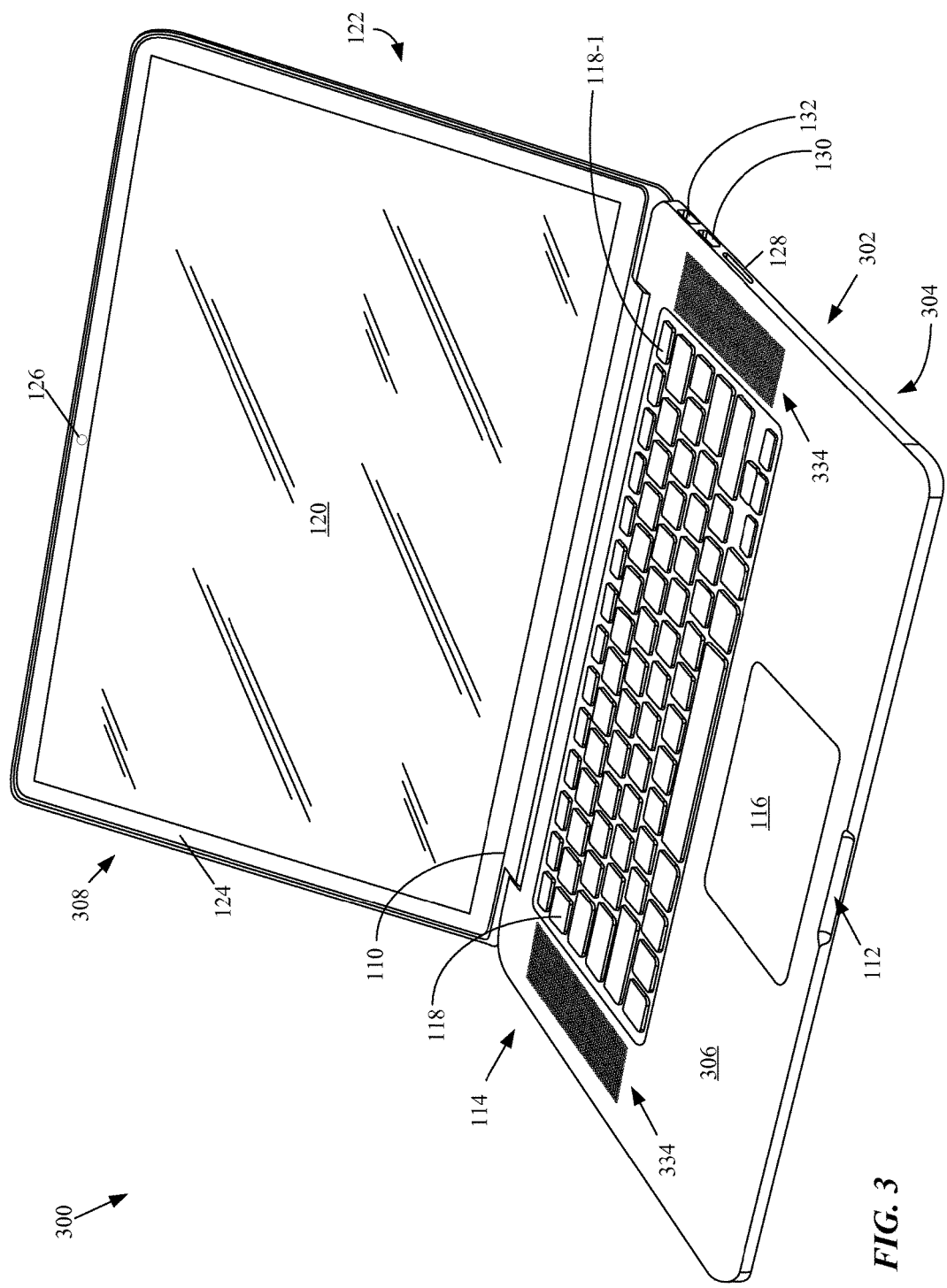
FIG. 3 shows another embodiment of the portable computing device in an open state according to an example embodiment of the present disclosure.

FIG. 3 shows another embodiment in the form of portable computing device 300 that is larger than portable computing device 100. Since portable computing device 300 is larger in size than portable computing device 100, certain features shown in FIG. 1 are modified, or in some cases added, in portable computing device 300. For example, speaker grid 334 can be used to port audio from an associated audio component enclosed within base portion 102. In some embodiments, a microphone can be located at a side portion of top case 106 that can be spaced apart to improve frequency response of an associated audio circuit.

Figure 4:
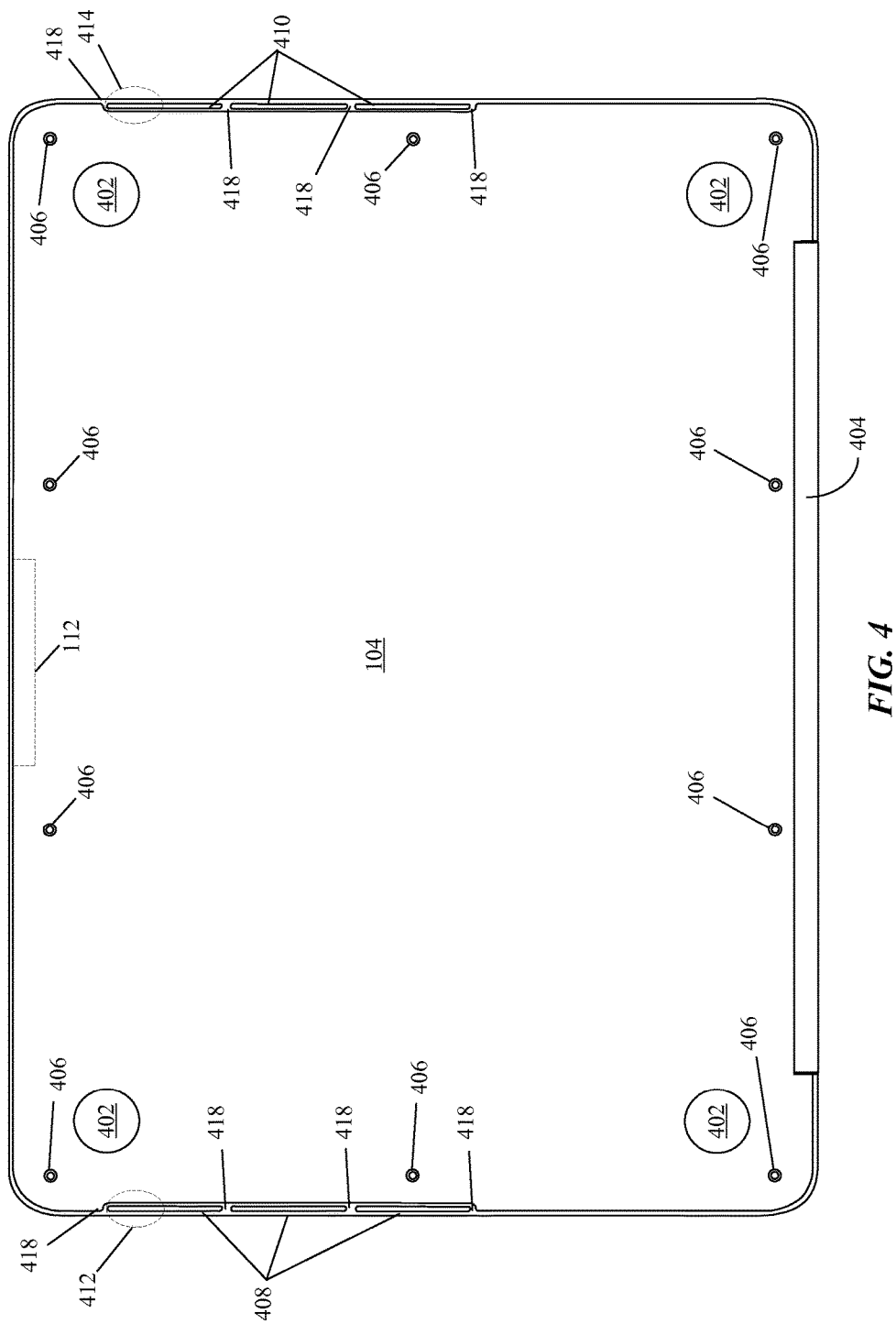
FIG. 4 shows an external view of the bottom case of the portable computing device of FIG. 1 or 3 according to an example embodiment of the present disclosure.

FIG. 4 shows an external view of bottom case 104 showing relative positioning of support feet 402, insert 112, cosmetic wall 404 that can be used to conceal clutch assembly 110 and fasteners 406 used to secure bottom case 104 and top case 106 together. Support feet 402 can be formed of wear resistant and resilient material such as plastic. Also in view are multi-purpose front side sequentially placed vents 408 and 410 that can be used to provide a flow of outside air that can be used to cool internal components. In the described embodiment, vents 408 and 410 can be placed on an underside of top cover 106 in order to hide the vents from view as well as obscure the view of an interior of portable computing device 100 from the outside. Vents 408 and 410 can act as a secondary air intake subordinate to primary air intake vents located at a rear portion of portable computing device 100 (described below). In this way, vents 408 and 410 can help to maintain an adequate supply of cool air in those situations where portions of the rear vents are blocked or otherwise have their air intake restricted.

Vents 408 and 410 can also be used to output audio signals in the form of sound generated by an audio module (not shown). In one embodiment, a selected portion (such as portions 412 and 414) can be used to output sound at a selected frequency range in order to improve quality of an audio presentation by portable computing device 100. Vents 408 and 410 can be part of an integrated support system in that vents 408 and 410 can be machined from the outside and cut from the inside during fabrication of top case 106. As part of the machining of vents 408 and 410, stiffener ribs 416 (shown in FIG. 5) can be placed within vent openings 408 and 410 to provide additional structural support for portable computing device 100. Stiffener ribs 416 can be formed using what is referred to as a T cutter that removes material subsequent to the formation of the vent openings during the fabrication of top case 106.

Moreover, trusses 418 can be formed between vents 408 and 410 in combination with ribs 416 can add both structural support as well as assist in defining both the cadence and size of vents 408 and 410. The cadence and size of vents 408 and 410 can be used to control air flow into portable computing device 100 as well as emission of RF energy in the form of EMI from portable computing device 100. Accordingly, stiffener ribs 416 can separate an area within vents 408 and 410 to produce an aperture sized to prevent passage of RF energy. As well known in the art, the size of an aperture can restrict the emission of RF energy having a wavelength that can be "trapped" by the aperture. In this case, the size of vents 408 and 410 is such that a substantial portion of RF energy emitted by internal components can be trapped within portable computing device 100. Furthermore, by placing vents 408 and 410 at a downward facing surface of top case 106, the aesthetics of portable computing device 100 can be enhanced since views of internal components from an external observer are eliminated.

The portable computing devices 100, 300 described above and other embodiments of portable computing devices may employ mass storage devices to store data therein. Example embodiments of mass storage devices include hard drives and solid state storage devices such as flash memory devices. The operation of mass storage devices may be affected when subjected to relatively high forces, such as those that may occur during impacts. For example, when a portable computing device is subjected to a drop event, the mass storage may be damaged or temporarily become inoperable. Accordingly, it may be undesirable to directly mount a rigid structure of the mass storage device to a rigid structure of the portable computing device (e.g., an internal frame therein).

Figure 5:
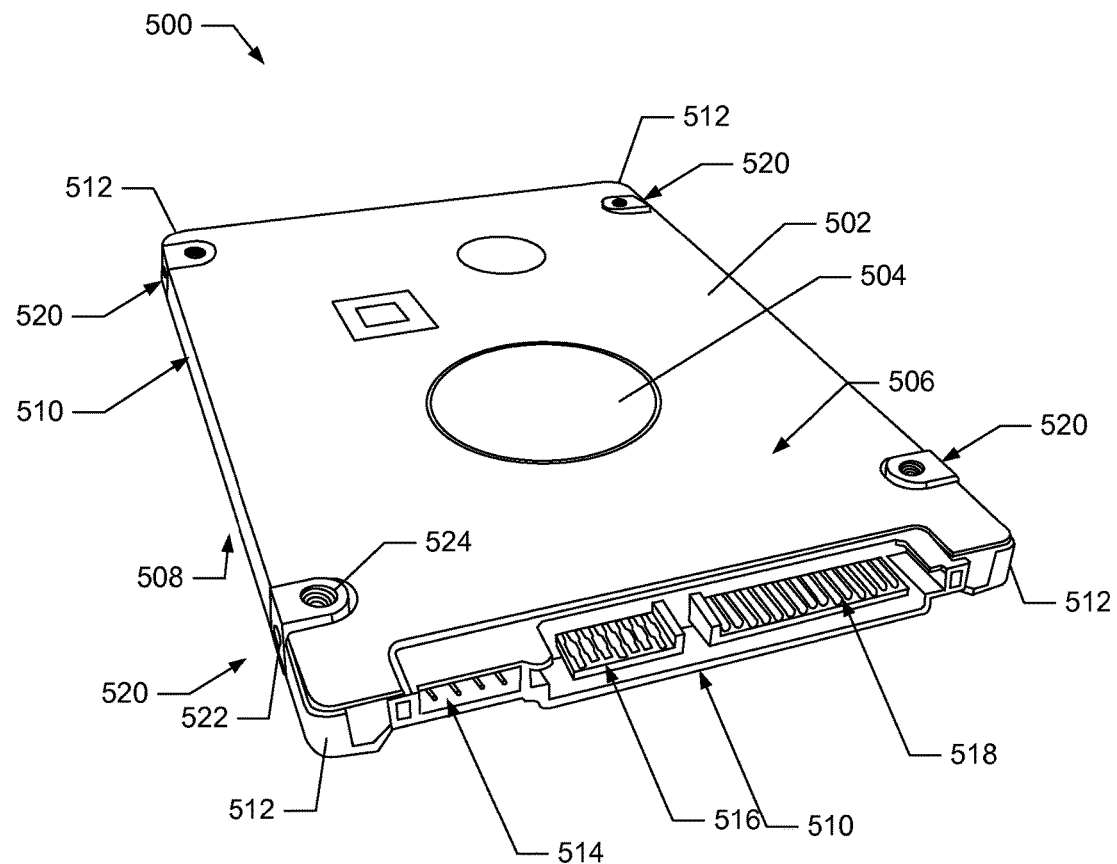
FIG. 5 illustrates a mass storage device, and more particularly a hard drive device.

FIG. 5 illustrates an example embodiment of a hard drive device 500 that may be included in the portable computing device. In particular, FIG. 5 illustrates a 2.5 inch hard drive device, although the portable computing device may employ various other sizes and shapes of mass storage devices in other embodiments. As illustrated, the hard drive device 500 includes an outer casing 502 through which a spindle 504 extends. The hard drive device 500 may comprise a first major surface 506 and an opposing second major surface 508. A plurality of edge surfaces 510 may define a plurality of corners 512. Various connectors may be provided at one or more of the edge surfaces 510 of the hard drive device 500. The connectors may include a power connector 514, a jumper block 516, and an integrated drive electronics (IDE) connector 518 in some embodiments.

Further, the hard drive device 500 may include a plurality of attachment structures 520. As illustrated, the attachment structures 520 may be provided proximate the corners 512 of the hard drive device 500. Each attachment structure 520 may include a horizontal mounting point 522 and a vertical mounting point 524, which may be respectively configured to receive a threaded fastener therein in order to mount the hard drive device 500 to the portable computing device.

Figure 6:
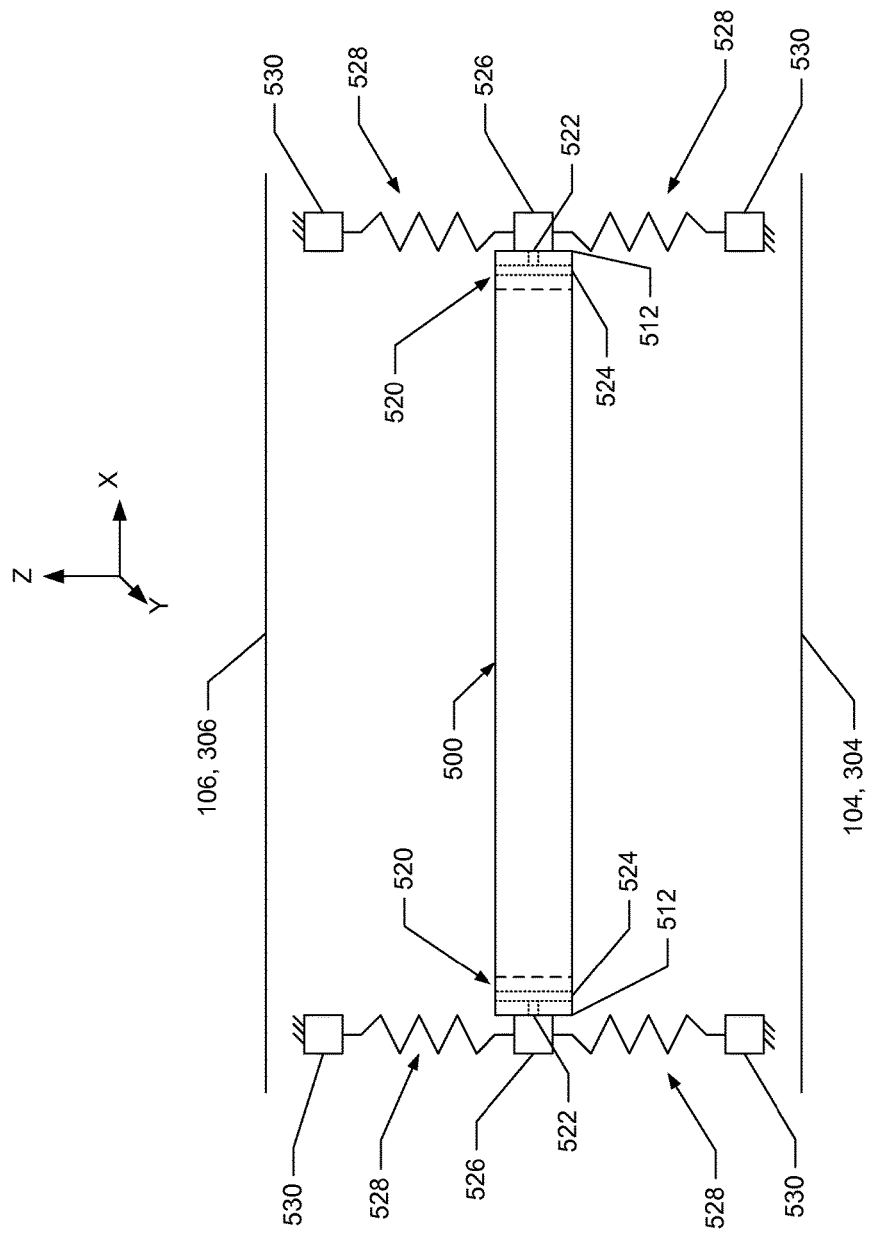
FIG. 6 schematically illustrates a mounting arrangement for the hard drive device of FIG. 5 employing isolators.

In this regard, an example mounting arrangement for the hard drive device 500 that employs the attachment structures 520 is schematically illustrated in FIG. 6. As illustrated, the mounting arrangement may employ couplers 526 to attach to the mounting points 520. Isolators 528, typically embodied as rubber bushings, may be attached to the couplers 526 at one end and stationary attachment structures 530 which may be hard mounted with the portable computing device. Accordingly, during a drop event, the isolators 528 may allow the hard drive device 500 to move relative to the couplers 526 and the remainder of the portable computing device such that the force transferred to the hard drive device may be spread out over a longer period of time and thereby the impulse applied to the hard drive device may be reduced in comparison to a mounting arrangement in which the hard drive device is directly coupled to a rigid structure within the portable computing device.

However, the mounting arrangement illustrated in FIG. 6 may suffer from several deficiencies. In this regard, the mounting structure may require a relatively large amount of space. As illustrated, by employing the horizontal mounting points 522 on the attachment structures 520, the mounting arrangement may occupy a relatively larger amount of space along an X-axis. Although use of the vertical mounting points 524 may decrease the width of the mounting arrangement along the X-axis, the couplers 526 may be shifted vertically in such an arrangement, thereby increasing the vertical height of the mounting arrangement along a Z-axis.

Further, regardless of whether the horizontal or vertical mounting points 522, 524 are employed, the vertical height of the mounting arrangement along the Z-axis may be relatively large due to employing isolators 528 on both the top and bottom of the hard drive device 500. Additionally, as illustrated, the isolators 528 may not be mounted directly to a top case 106, 306 or a bottom case 104, 304 of the portable computing device, which may further increase the height of the mounting arrangement along the Z-axis.

Also, by mounting the hard drive device 500 at the corners 512 thereof (e.g., by using the attachment structures 520 mounted at the corners), the hard drive device may tend to flex and act like a diaphragm when subjected to an impact or vibrations. Thus, the forces to which the hard drive device 500 is subjected, particularly at the center thereof, may be amplified by the flexing of the hard drive device when mounted only at the corners thereof.

Additionally, the isolators 528 may transmit vibrations out from the hard drive device 500 through the stationary attachment structures 530, or other components may transmit vibrations through the stationary attachment structures and the isolators to the hard drive device. In this regard, although solid state memory devices may be relatively more durable than hard drive devices, it may still be desirable to avoid hard mounting a solid state memory device to a rigid component of a portable computing device because some embodiments of mass storage devices may be adversely affected when subjected to certain vibrations that may be transmitted thereto. Conversely, mass storage devices employing moving parts (e.g., hard drive devices) may transmit vibrations outwardly therefrom, which may adversely affect other components of the portable computing device.

Accordingly, embodiments of the present disclosure provide apparatuses configured to avoid the above-noted problems. Note that the description provided herein is made by way of reference to the hard drive device 500 illustrated in FIG. 5. However, the disclosure is also applicable to other embodiments of mass storage devices, as noted above.

Figure 7A:
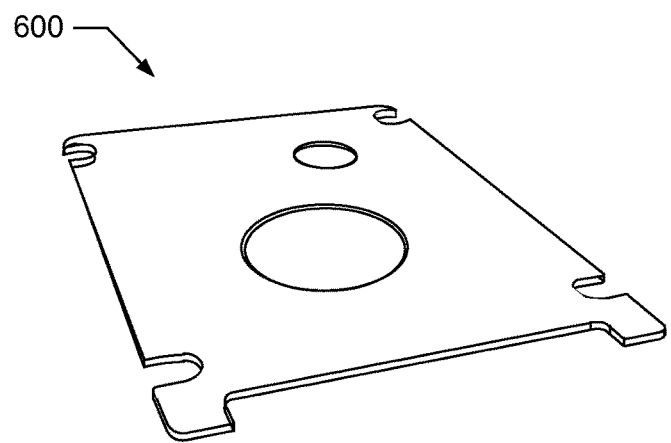
FIG. 7A illustrates a top major surface absorber comprising a first elastomeric material according to an example embodiment of the present disclosure.
Figure 7B:
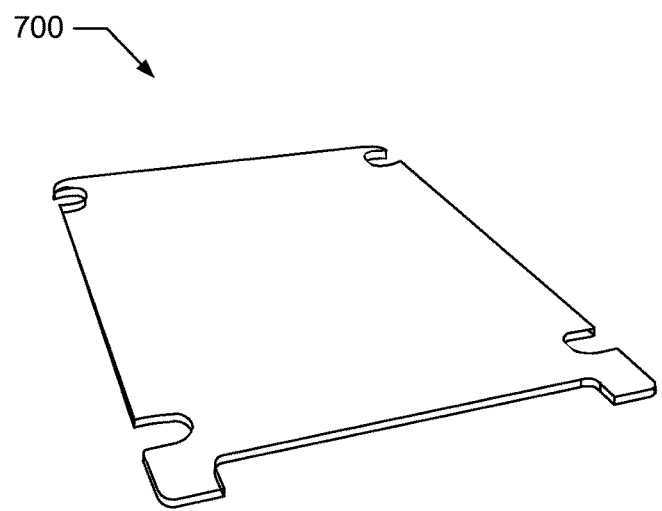
FIG. 7B illustrates a bottom major surface absorber comprising the first elastomeric material according to an example embodiment of the present disclosure.

In this regard, FIGS. 7A and 7B illustrate absorbers that may be employed in mounting arrangements according to embodiments of the present disclosure. In this regard, FIG. 7A illustrates an embodiment of a major surface absorber 600 configured to engage the first major surface 506 of the hard drive device 500, and FIG. 7B illustrates a major surface absorber 700 configured to engage the second major surface 508 of the mass storage device. As illustrated, the major surface absorbers 600, 700 may be configured to substantially conform to the shape of the hard drive device 500 at the major surfaces 506, 508 and include cutouts for the spindle 504, attachment structures 520, and or other features thereof. Thereby, the major surface absorbers 600, 700 may define substantially planar surfaces while avoiding contact with any moving parts of the hard drive device 500. The major surface absorbers 600, 700 may be formed from various embodiments of a first elastomeric material. For example in one embodiment the major surface absorbers 600, 700 may comprise foam (e.g., open cell foam or closed cell foam) or rubber.

Figure 8A:
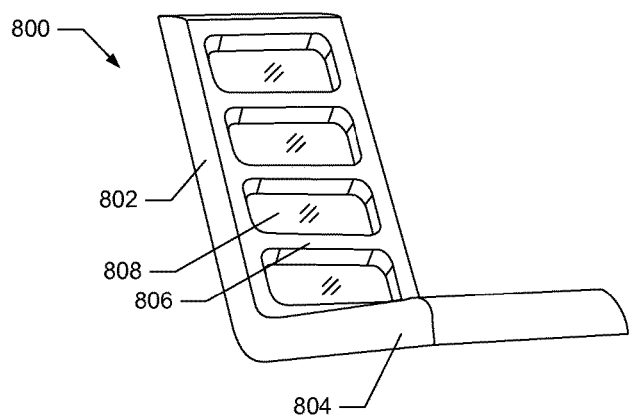
FIG. 8A illustrates a corner absorber comprising perpendicular walls according to a first example embodiment of the present disclosure.
Figure 8B:
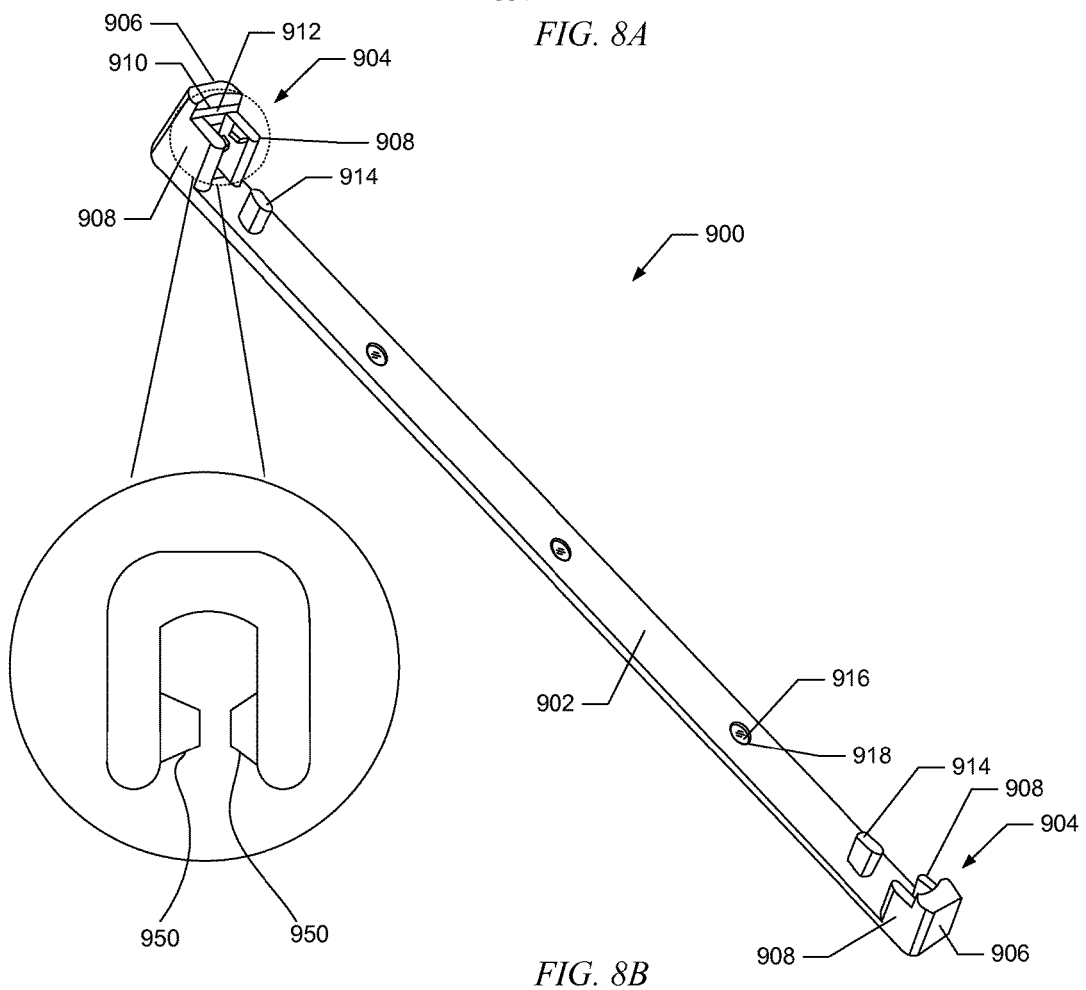
FIG. 8B illustrates a corner absorber comprising a longitudinal wall and end caps according to a second example embodiment of the present disclosure.

Additional absorbers that may be employed in mounting arrangements according to embodiments of the present disclosure are illustrated in FIGS. 8A and 8B. More particularly, FIGS. 8A and 8B illustrate embodiments of corner absorbers 800, 900 configured to engage the corners 512 of the hard drive device 500. The corner absorbers 800, 900 may be formed from various embodiments of a second elastomeric material, which may be the same as or different from the first elastomeric material. For example in one embodiment the corner absorbers 800, 900 may comprise foam (e.g., open cell foam or closed cell foam) or rubber.

The corner absorber 800 illustrated in FIG. 8A is configured to engage a corner 512 of the hard drive device 500 and extend a relatively short distance along the edge surfaces 510 that define the corner. Thus, four of the corner absorbers 800 may be employed to engage each of the four corners 512 of the hard drive device 500.

The corner absorber 800 illustrated in FIG. 8A may comprise first and second walls 802, 804 that extend substantially perpendicularly from one another. As illustrated, in some embodiments the corner absorber 800 may include a plurality of ridges 806 and recesses 808 that are configured to extend perpendicularly from the hard drive device 500 when the corner absorber is engaged therewith.

In contrast to the corner absorber 800 illustrated in FIG. 8A, the corner absorber 900 illustrated in FIG. 8B is configured to extend between two corners 512 of the hard drive device 500 and the edge surface 510 therebetween. Accordingly, two of the corner absorbers 900 may be employed to engage each of the four corners 512 of the hard drive device 500. In embodiments of the hard drive device 500 that are rectangular, the corner absorbers 900 may extend along either the shorter, or the longer pair of the edge surfaces 510 thereon, depending on the position of the connectors on the hard drive device.

As illustrated, in some embodiments the corner absorber 900 may include a longitudinal wall 902 and opposing end caps 904. The end caps 904 may each include an end wall 906 and two side walls 908 that are configured to collectively surround a corner 512 of the hard drive device 500. Further, the corner absorber 900 may include a plurality of ridges 910 and recesses 912 that are configured to extend perpendicularly from the hard drive device 500 when the corner absorbers are coupled thereto. In some embodiments the ridges 910 and recesses 912 may be provided only at the end caps 904, whereas in other embodiments the ridges and recesses may additionally or alternatively be provided along the length of the longitudinal wall 902. Additionally, protrusions 914 may extend perpendicularly from the longitudinal wall 902 in the same direction that the opposing end caps 904 extend therefrom.

In one embodiment, tuned finger supports 950 can be disposed on inner surfaces of side walls 908. A detail view of one end cap 904 is shown in FIG. 8B. Although only shown on one of the two end caps 904, tuned finger supports 950 can be included on both end caps 904. The design geometry and material used to form tuned finger supports 950 can be controlled to provide a predetermined spring rate for supporting the hard drive device 500 particularly during a drop event. In one embodiment, the tuned finger supports 950 can function in cooperation with foam absorbers as described herein to support hard disk drive 500.

Figure 9:
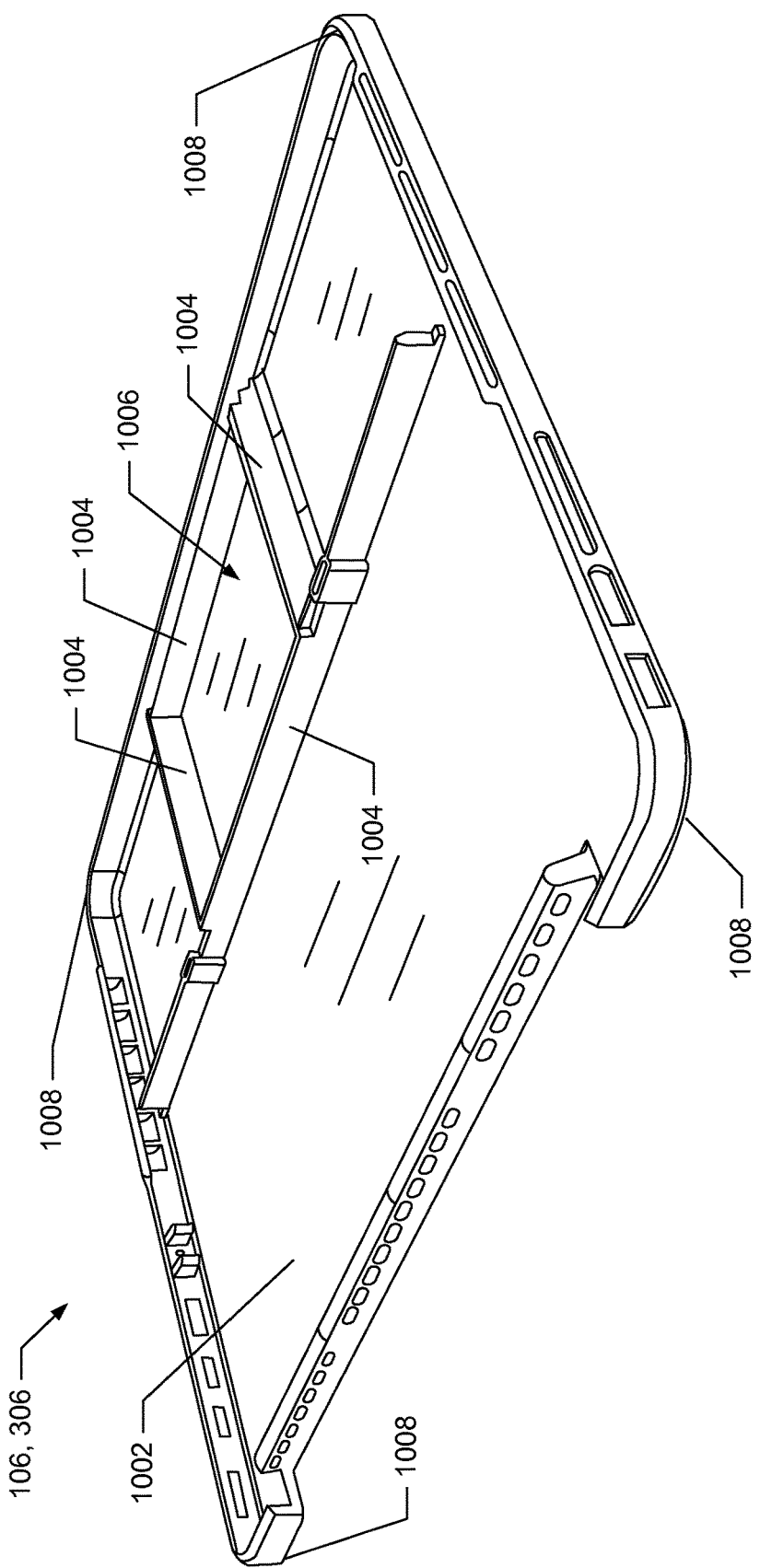
FIG. 9 illustrates a top case comprising a major surface and a plurality of side walls that define a compartment according to an example embodiment of the present disclosure.

FIG. 9 illustrates an embodiment of a case, and more particularly the top case 106, 306 of the portable computing device. As illustrated, the top case 106, 306 may comprise a major wall 1002 and a plurality of side walls 1004 that define a compartment 1006. For example, in one embodiment the major wall 1002 and the side walls 1004 defining the compartment 1006 may define integral portions of the top case 106, 306. The compartment 1006 may be configured to receive the hard drive device 500 and absorbers 600, 700, 800, 900 therefor.

Figure 10:
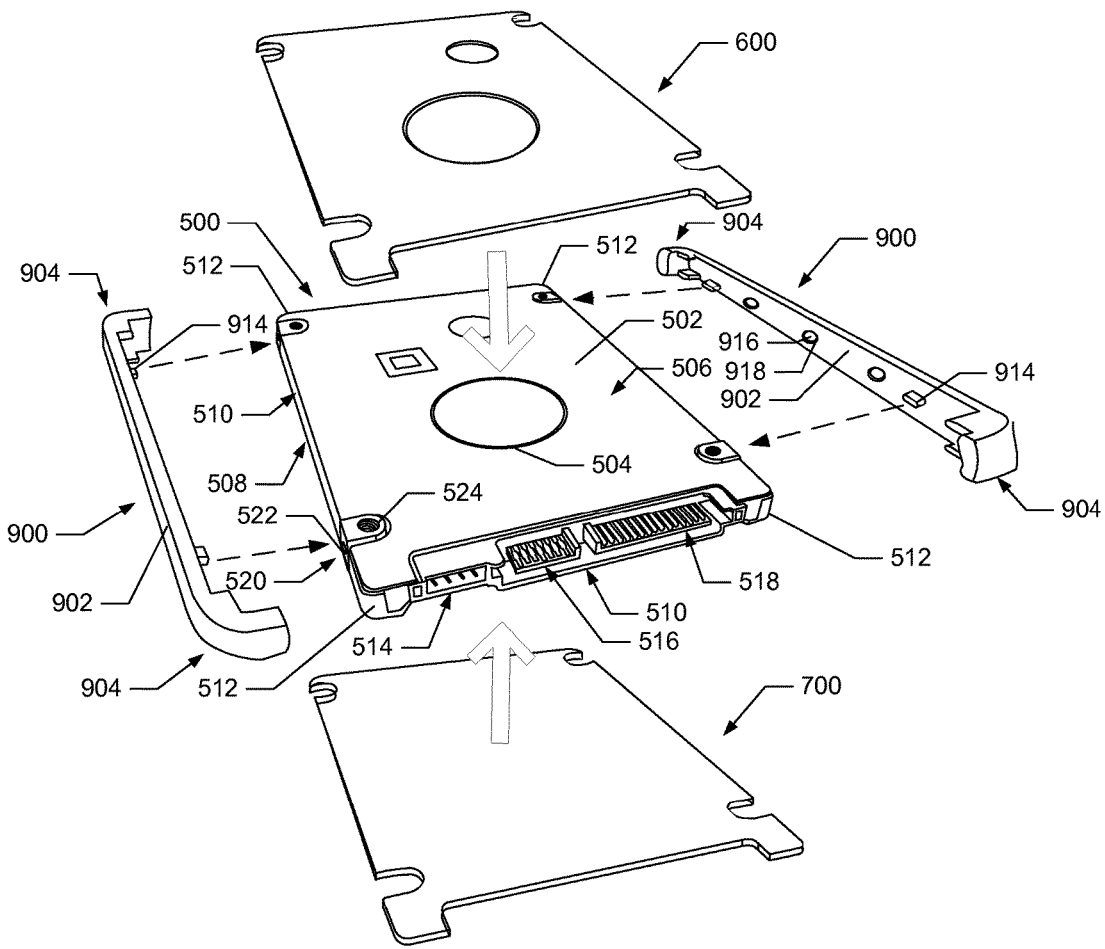
FIG. 10 illustrates operations performed in coupling the major surface absorbers and the second embodiment of the corner features to the hard drive device of FIG. 1 according to an example embodiment of the present disclosure.

In this regard, FIG. 10 illustrates one embodiment of the operations performed in preparing the hard drive device 500 for insertion into the compartment 1006 in the top case 106, 306. In particular, FIG. 10 illustrates the operations performed in preparing the hard drive device 500 for insertion into the compartment 1006 in the top case 106, 306 with the major surface absorbers 600, 700 and the corner absorbers 900 illustrated in FIG. 8B. As illustrated, the major surface absorbers 600, 700 may be coupled to the first and second major surfaces 506, 508 of the hard drive device 500, for example via adhesive coupling.

Further, the corner absorbers 900 illustrated in FIG. 8B may be coupled to the hard drive device 500. In this regard, the longitudinal walls 902 of the corner absorbers 900 may be brought into contact with the edge surfaces 510 of the hard drive device 500 such that the protrusions 914 engage the horizontal mounting points 522 of the attachment structures 520. Further, the end caps 904 may engage the corners 512 of the hard drive device 500 as the corner absorbers 900 are coupled to the hard drive device.

Thus, in some embodiments the corner absorbers 900 may be mechanically coupled to the hard drive device 500, although adhesive may be additionally or alternatively employed. In particular, the protrusions 914 may engage the horizontal mounting points 522 via interference fit. Further, the end caps 904 may engage the corners 512 of the hard drive device 500 via interference fit. The ridges 910 and recesses 912 (see, e.g., FIG. 8B) may assist in providing the interference fit.

Figure 11:
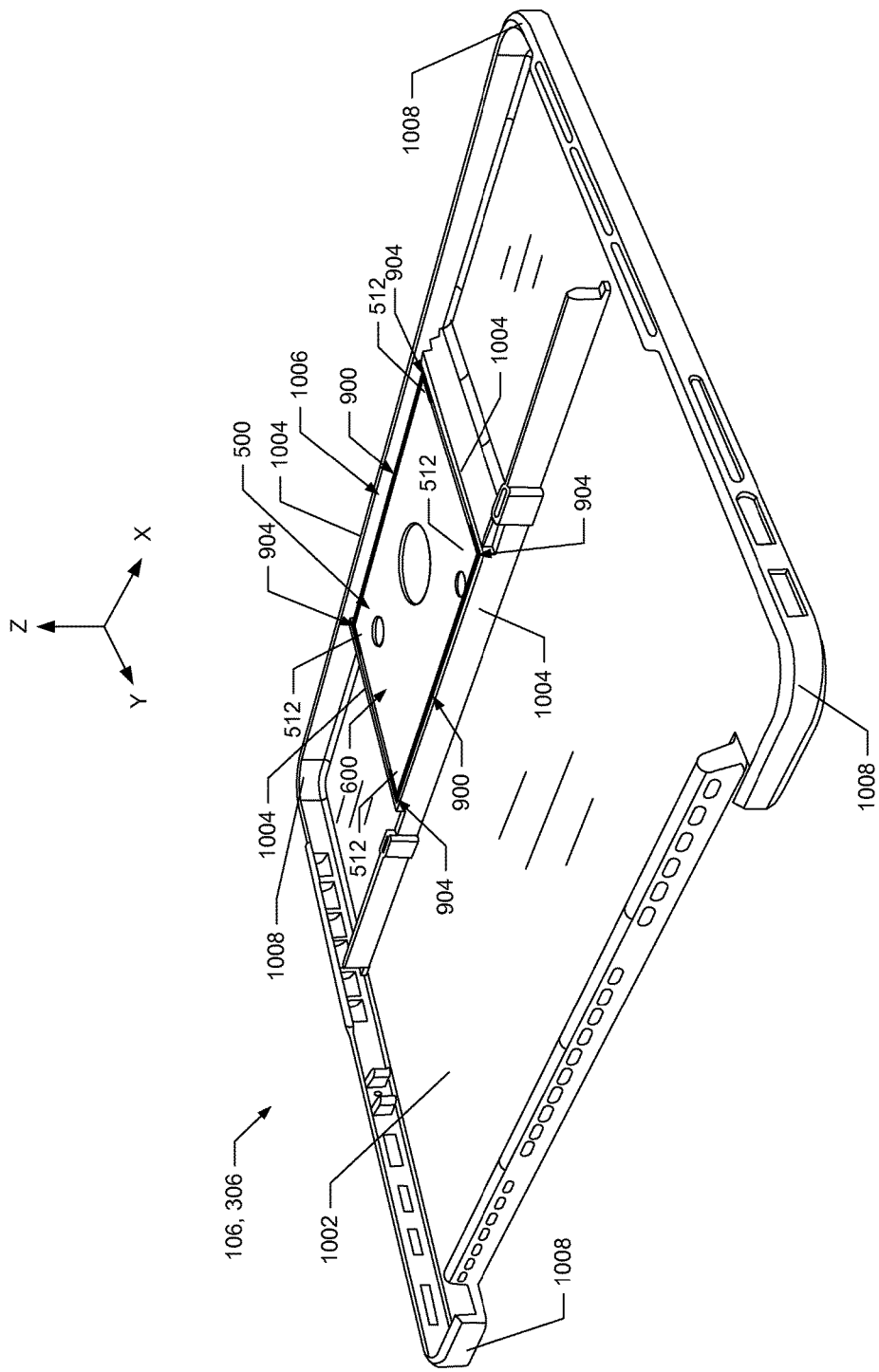
FIG. 11 illustrates the hard drive disk and the absorbers of FIG. 10 after insertion in the compartment of the top case of FIG. 9 according to an example embodiment of the present disclosure.

Accordingly, the corner absorbers 900 and the major surface absorbers 600, 700 may be coupled to the hard drive device 500, and the entire assembly may be inserted into the compartment 1004 as illustrated in FIG. 11. In some embodiments the side walls 1004 defining the compartment 1006 may be coated with a primer or a lubricant that assists in allowing for insertion of the assembly into the compartment. Further, in some embodiments the corner absorbers 900 may be reinforced by a metal band 916, which may be visible in some embodiments through apertures 918, which may be formed during molding the corner absorbers from the second elastomeric material (see, e.g., FIGS. 4B and 6). The metal band 916 may provide the corner absorbers 900 with a degree of rigidity that may help maintain the shape of the corner absorbers and thereby assist in maintaining the coupling between the corner absorbers and the corners 512 of the hard drive device 500 during and after insertion into the compartment 1006. Note that in some embodiments the corner absorbers 900 may be compressed during insertion of the hard drive device 500, which may preload the second elastomeric material.

Figure 12:
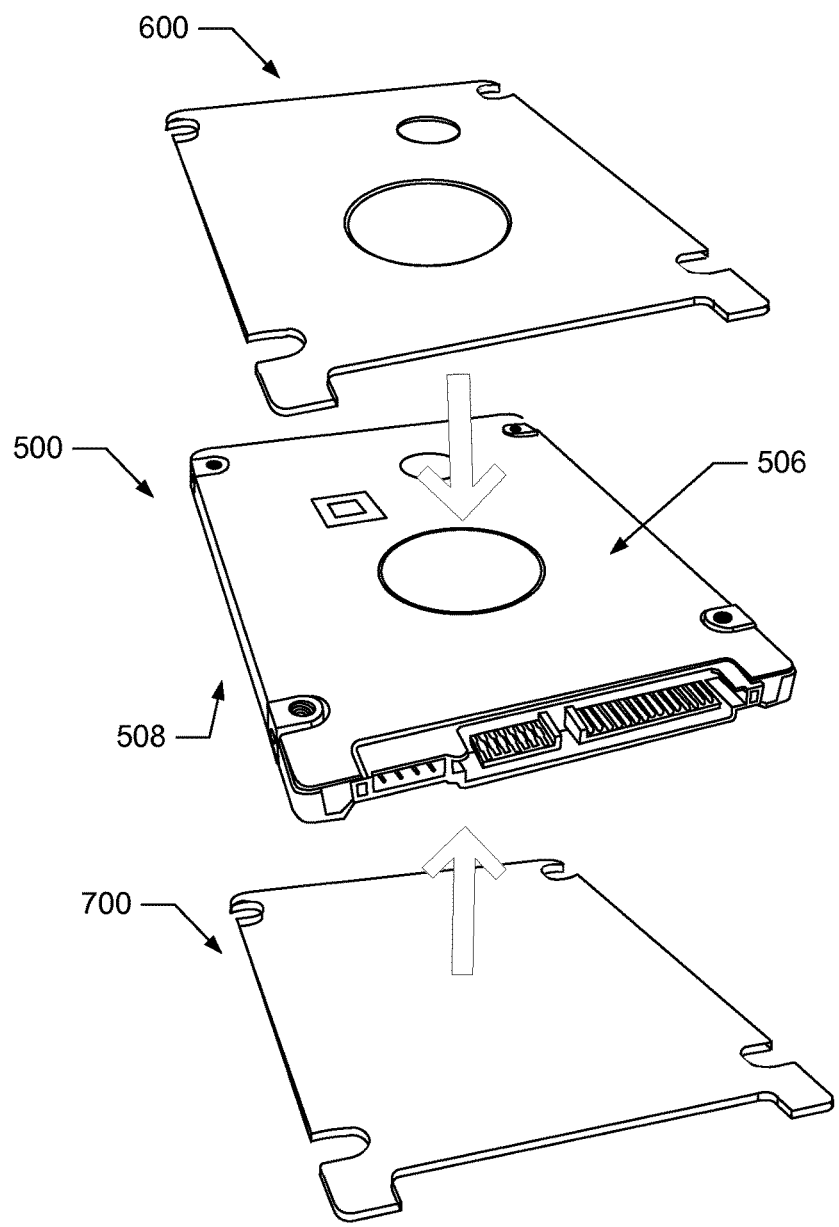
FIG. 12 illustrates the operations performed in coupling the major surface absorbers to the hard drive device of FIG. 5 according to an example embodiment of the present disclosure.

The operations performed in preparing the hard drive device 500 for insertion into the compartment 1006 in the top case 106, 306 with the major surface absorbers 600, 700 and the corner absorbers 800 illustrated in FIG. 8A are similar in that they may involve coupling the major surface absorbers 600, 700 to the first and second major surfaces 506, 508 of the hard drive device 500, for example via adhesive coupling, as illustrated in FIG. 12. However, the operations may differ in other respects.

Figure 13:
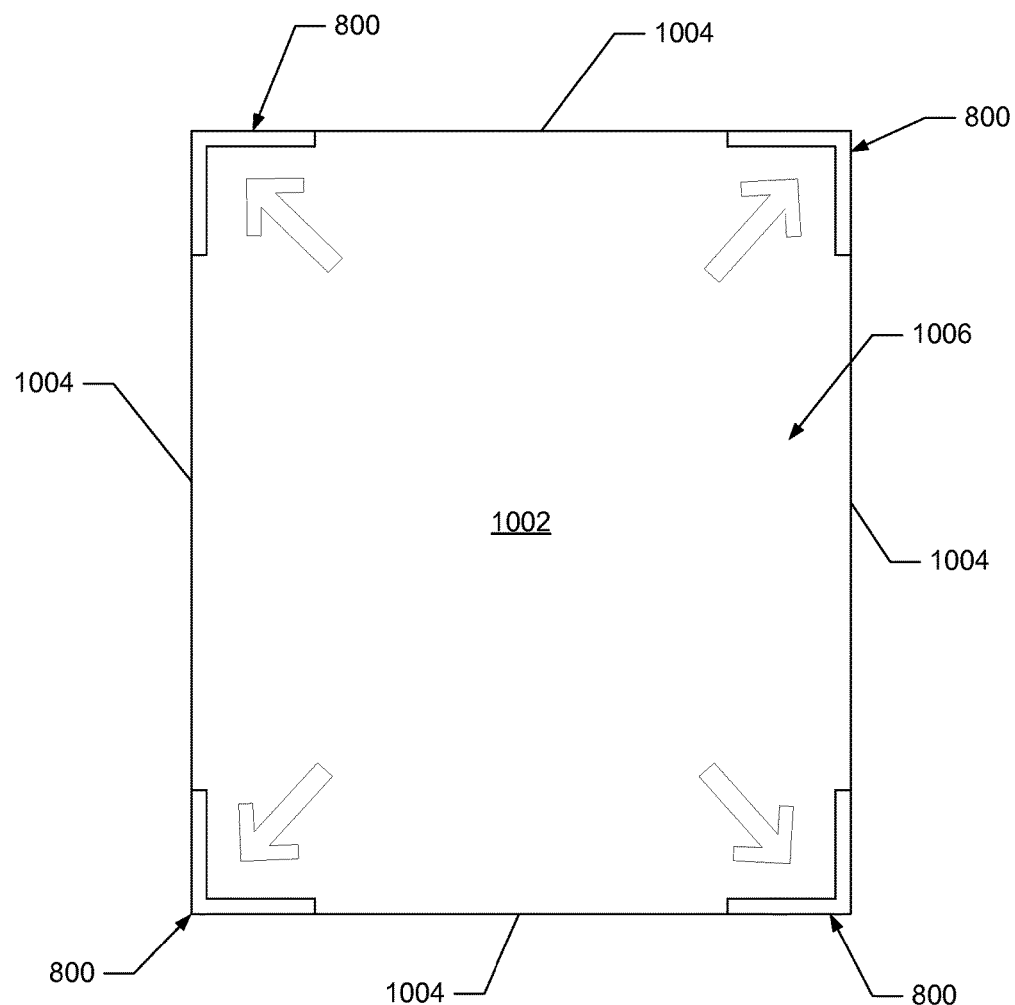
FIG. 13 illustrates the operations performed in coupling the first embodiment of the corner absorbers to the side walls defining the compartment of the tray of FIG. 9 according to an example embodiment of the present disclosure.
Figure 14:
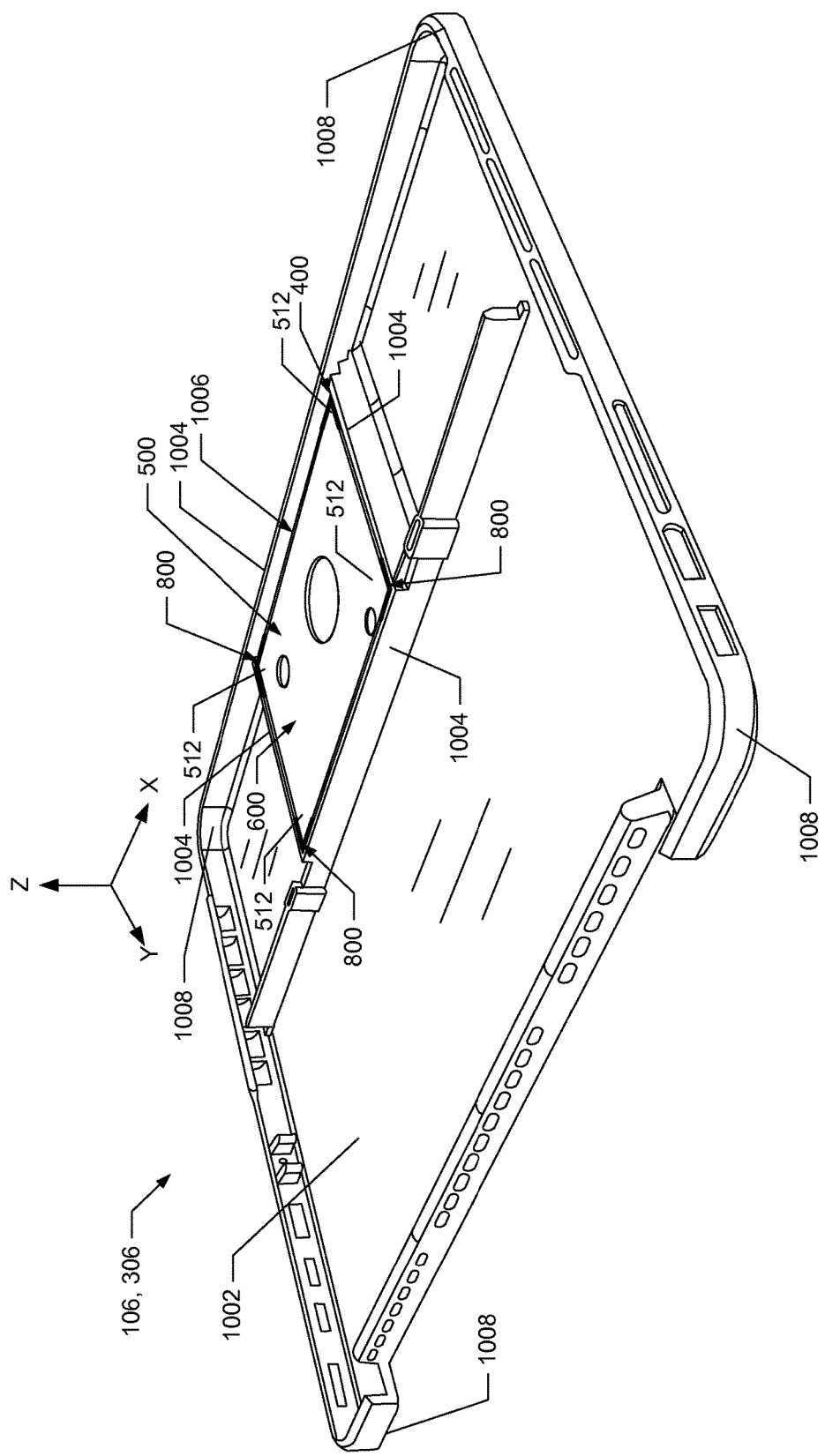
FIG. 14 illustrates the hard drive disk and the absorbers of FIGS. 12 and 13 after insertion in the compartment of the top case of FIG. 9 according to an example embodiment of the present disclosure.

In this regard, as illustrated in FIG. 13, the corner absorbers 800 may be coupled to the side walls 1004 of the top case 106, 306 that form the compartment 1006 prior to inserting the hard drive device 500 therein. For example, the corner absorbers 800 may be adhesively coupled to the side walls 1004 of the compartment 1006. Thereafter, as illustrated in FIG. 14, the hard drive device 500 may be inserted into the compartment 1006 with the corner absorbers 800 positioned between the corners 512 of the hard drive device and the side walls 1004 defining the compartment. Accordingly, in embodiments employing the corner absorbers 800 illustrated in FIG. 8A, the hard drive device 500 may be engaged with, but decoupled from, the corner absorbers. This differs from the embodiment of the corner absorbers 900 illustrated in FIG. 8B, which couple to the corners 512 of the hard drive device 500 and engage the side walls 1004 of the compartment, but are decoupled therefrom. Note that in some embodiments the corner absorbers 800 may be compressed during insertion of the hard drive device 500, which may preload the second elastomeric material.

Regardless of the particular embodiment of corner absorbers 800, 900 employed, the corner absorbers may provide a degree of compliance along the Z-axis due to the decoupling between either the corner absorbers and the hard drive device 500 (e.g., when employing the corner absorbers 800 illustrated in FIG. 8A) or between the corner absorbers and the side walls 1004 defining the compartment (e.g., when employing the corner absorbers 800 illustrated in FIG. 8B).

Figure 15:
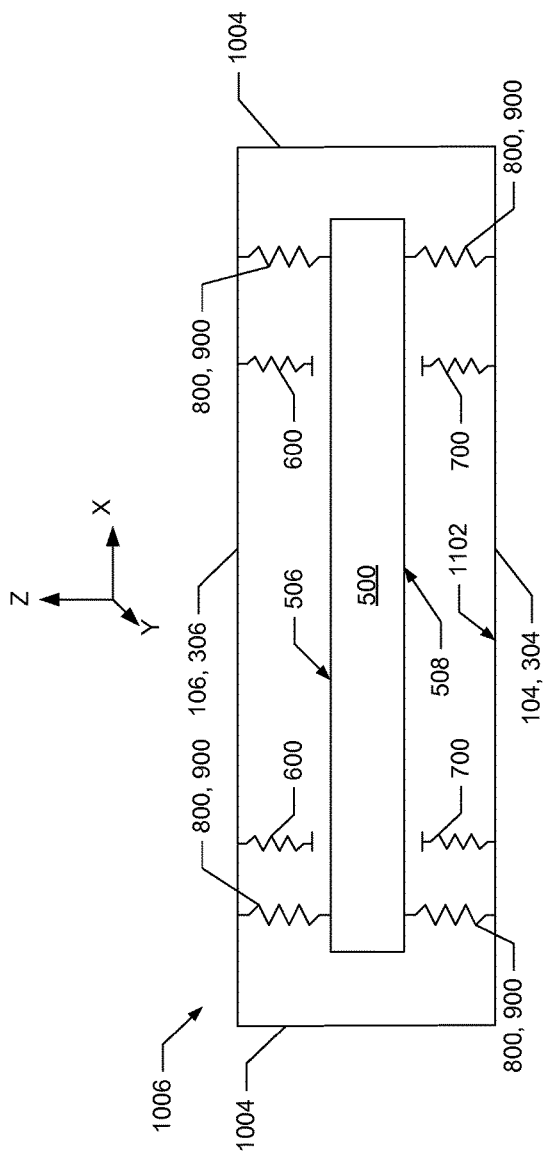
FIG. 15 schematically illustrates a mounting arrangement for the hard drive device of FIG. 5 employing the major surface absorbers of FIGS. 7A and 7B and the corner absorbers of FIG. 8A or 8B according to an example embodiment of the present disclosure.

In this regard, FIG. 15 schematically illustrates a view of the absorbers at the compartment 1006 as they relate to movement along the Z-axis. As illustrated, in one embodiment the hard drive device 500 may be engaged with the corner absorbers 800, 900 such that any movement along the Z-axis is resisted by the corner absorbers 800, 900. However, due to the corner absorbers 800, 900 being coupled to only one of the hard drive device 500 and the side walls 1004 of the compartment in some embodiments, the spring force resisting movement may be relatively weak. This weak spring effect may be employed as a low pass filter configured to reduce noise transmitted from or to the hard drive device 500.

The major surface absorbers 600, 700 may be initially disengaged from the hard drive device 500 in a neutral configuration, as illustrated. In this regard, in some embodiments the major surface absorbers 600, 700 may be coupled to the top case 106, 306 and a second case (e.g. a rear case 104, 304), with gaps provided between the major surface absorbers and the hard drive device 500. Alternatively, as described above the major surface absorbers 600, 700 may be coupled to the first major surface 506 and the second major surface 508 of the hard drive device 500 such that the gaps are positioned between the major surface absorbers and the first major surface 1002 of the top case 106, 306 and a second major surface 1102 of the bottom case 104, 304. Thereby, the major surface absorbers 600, 700 may substantially avoid transferring vibration from or to the hard drive device 500. However, during a drop event along the Z-axis, the major surface absorbers 600, 700 may come into contact with one or both of the top case 106, 306 and the bottom case 104, 304 (or the hard drive device may come into contact with the major surface absorbers) and in such an event both the corner absorbers 800, 900 and the major surface absorbers may function to restrain movement of the hard drive device and limit the impact applied thereto. The major surface absorbers 600, 700 may define a greater spring rate than the corner absorbers 800, 900 in order to protect the hard drive device from damage due to impact.

In this regard, the major surface absorbers 600, 700 are configured to distribute force applied thereto to avoid the issues noted above with respect to a diaphragm effect increasing forces applied to the center of the hard drive device 500. Accordingly, by distributing the forces across the substantially planar surfaces of the major surface absorbers 600, 700, the forces applied to the hard disk drive 500 may be reduced. Further, use of the substantially planar major surface absorbers 600, 700 may reduce the height of the mounting arrangement by avoiding use of isolators.

In an alternate embodiment the rear case 104, 304, which is secured to the top case 106, 306 and retains the hard drive device 500 in the compartment 1004, may preload the major surface absorbers 600, 700 by compressing the major surface absorbers when secured to the top case. The preload may be employed to provide the major surface absorbers 600, 700 with an increased spring rate, which may assist in protecting the hard drive device 500 during a drop event. In one embodiment, the major surface absorbers 600, 700 may define recesses and protrusions that provide a two (or more) stage spring configuration in which the recesses are not compressed when subjected to the preload, and only act when subjected to additional force, such as during a drop event.

Further, a two stage spring configuration may still exist along the horizontal X and Y-axes. In this regard, the ridges 806, 910 may function as a first spring that remains in contact with the hard drive device 500, and the recesses 808, 912 may act as a stronger second spring that is spaced from the side walls in a neutral configuration and may only come into contact with the hard drive device during a drop event in the horizontal plane. Accordingly, the ridges 808, 910 may act as a low pass filter in the horizontal plane along the X and Y axes to resist transmitting vibrations from or to the hard drive device 500.

In some embodiments the location of the compartment 1006 may be configured to reduce the forces applied to the hard drive device 500. In this regard, as illustrated in FIGS. 5, 7 and 10, the compartment 1006 may be centered between two or more corners 1008 of the case (e.g., the top case 106, 306). By centering the compartment 1006 between two or more of the corners 1008 of the case, the hard drive device 500 received therein may avoid being subjected to secondary impacts associated with a drop event of the portable computing device. For example, when the portable computing device is dropped on one corner, an opposing corner may be subjected to impact shortly thereafter, and the secondary impact may be of equal or greater magnitude than the first impact. Thus, by centering the compartment 1006 between the corners 1008, the forces associated with impacts at the corners may not be fully transmitted to the hard drive device 500. In some embodiments the compartment 1006 may be positioned under a touch input device centered between the corners 1008.

Figure 16:
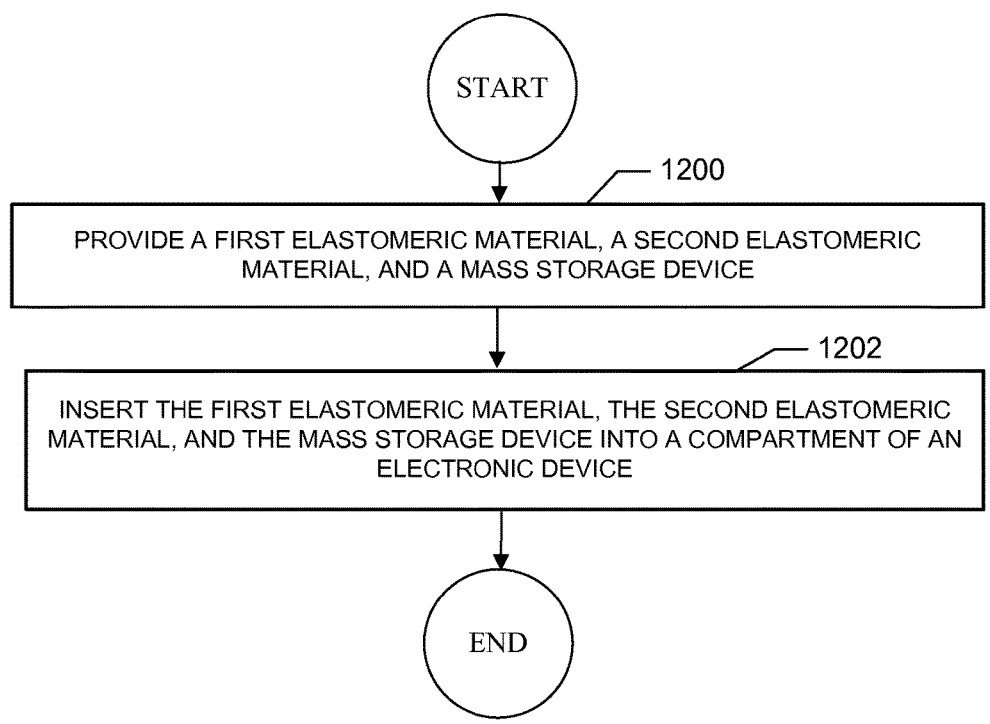
FIG. 16 schematically illustrates a method for mounting a mass storage device according to an example embodiment of the present disclosure.

A related method is also provided. As illustrated in FIG. 16, the method may include providing a first elastomeric material, a second elastomeric material, and a mass storage device, the mass storage device comprising a first major surface, a second major surface, and a plurality of edge surfaces defining a plurality of corners at operation 1200. Further, the method may include inserting the mass storage device, the first elastomeric material, and the second elastomeric material into a compartment defined by a major wall and a plurality of side walls of a case of a portable computing device with the first elastomeric material positioned between the first major surface of the mass storage device and with the major wall of the compartment and the second elastomeric material positioned between the corners of the mass storage device and the side walls of the compartment at operation 1202. Inserting the mass storage device into the compartment may comprise preloading the second elastomeric material In some embodiments the method may further comprise securing a second case to the case with the first elastomeric material between the second major surface of the mass storage device and the second case to retain the mass storage device in the compartment. Securing the second case to the case may comprise preloading the first elastomeric material. The method may additionally include adhesively coupling the second elastomeric material to the side walls of the compartment and/or mechanically coupling the second elastomeric material to the corners of the mass storage device via interference fit. The method may also include adhesively coupling the first elastomeric material to the first major surface and the second major surface.

Figure 17:
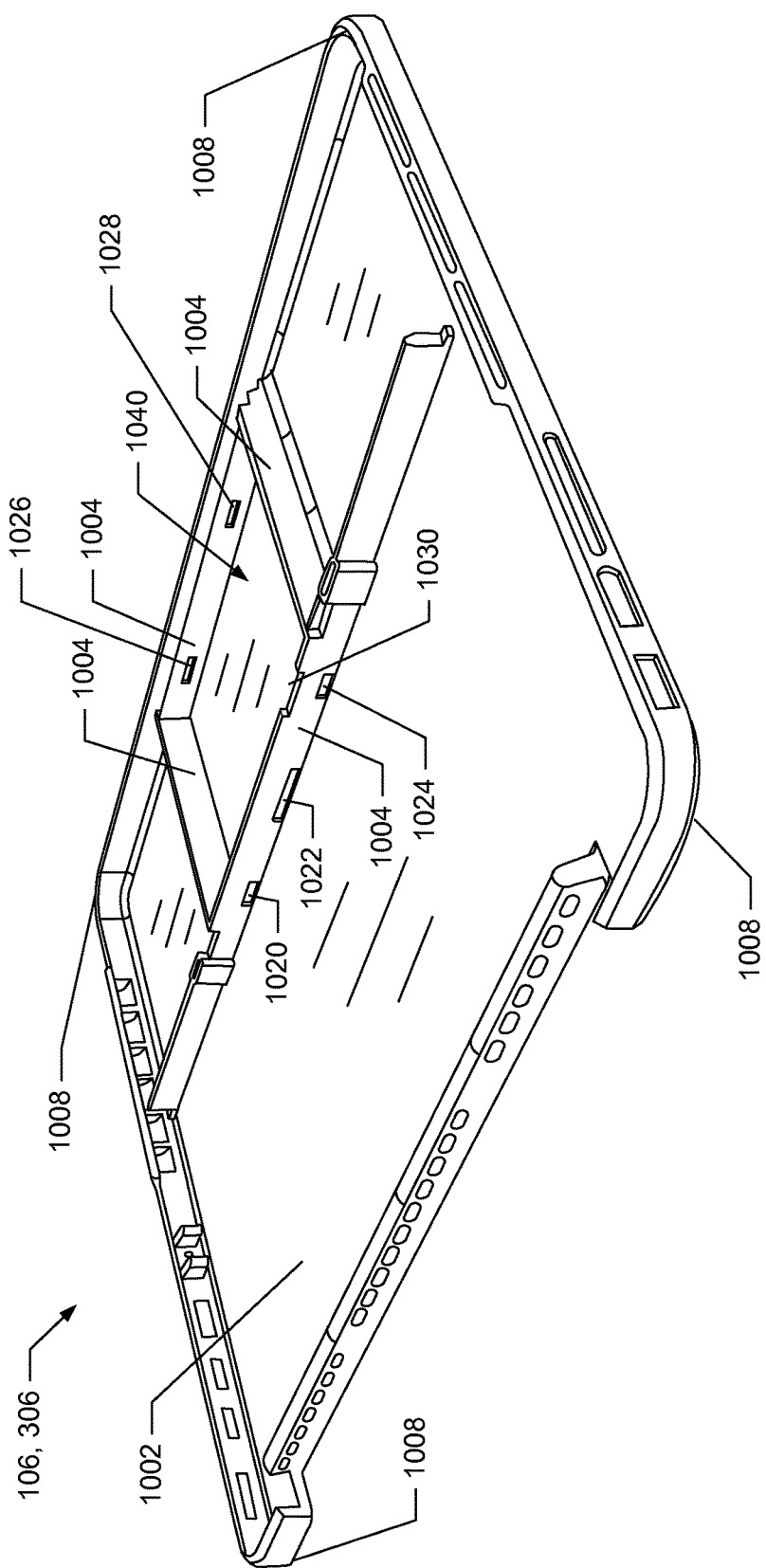
FIG. 17 illustrates a top case comprising a major surface and a plurality of side walls that define a compartment, wherein holes located on the plurality of side walls enable a removable assembly containing a mass storage device to be mounted in the compartment, according to an example embodiment of the present disclosure.

FIG. 17 illustrates a second embodiment of a case, and more particularly the top case 106, 306 of the portable computing device. As illustrated, the top case 106, 306 may comprise a major wall 1002 and a plurality of side walls 1004 that define a compartment 1040. For example, in one embodiment the compartment 1040 may be configured to receive a removable assembly, such as one shown in FIG. 18, for mounting a mass storage device. In one embodiment, holes 1020, 1022, 1024, 1026 and 1028 located on the plurality of side walls 1004 can enable a removable assembly with protruding features such as hooks to snap lock into compartment 1040. In another embodiment, depressions, instead of holes, on the plurality of side walls 1004 can enable a removable assembly with protruding features such as hooks to snap lock into compartment 1040. These depressions would all be facing the inside of compartment 1040 in order for the protruding features of removable assembly to be snap locking into them. In yet another embodiment, these depressions can be located at the same positions and be of the same sizes as holes 1020, 1022, 1024, 1026 and 1028 as shown in FIG. 17. Additionally, there is also a notch 1030 that creates an opening on one of the side wall 1004 to allow flex routing cable to exit from compartment 1040. In a further embodiment, touchpad 116 can be positioned to be on the other side of compartment 1040.

Figure 18:
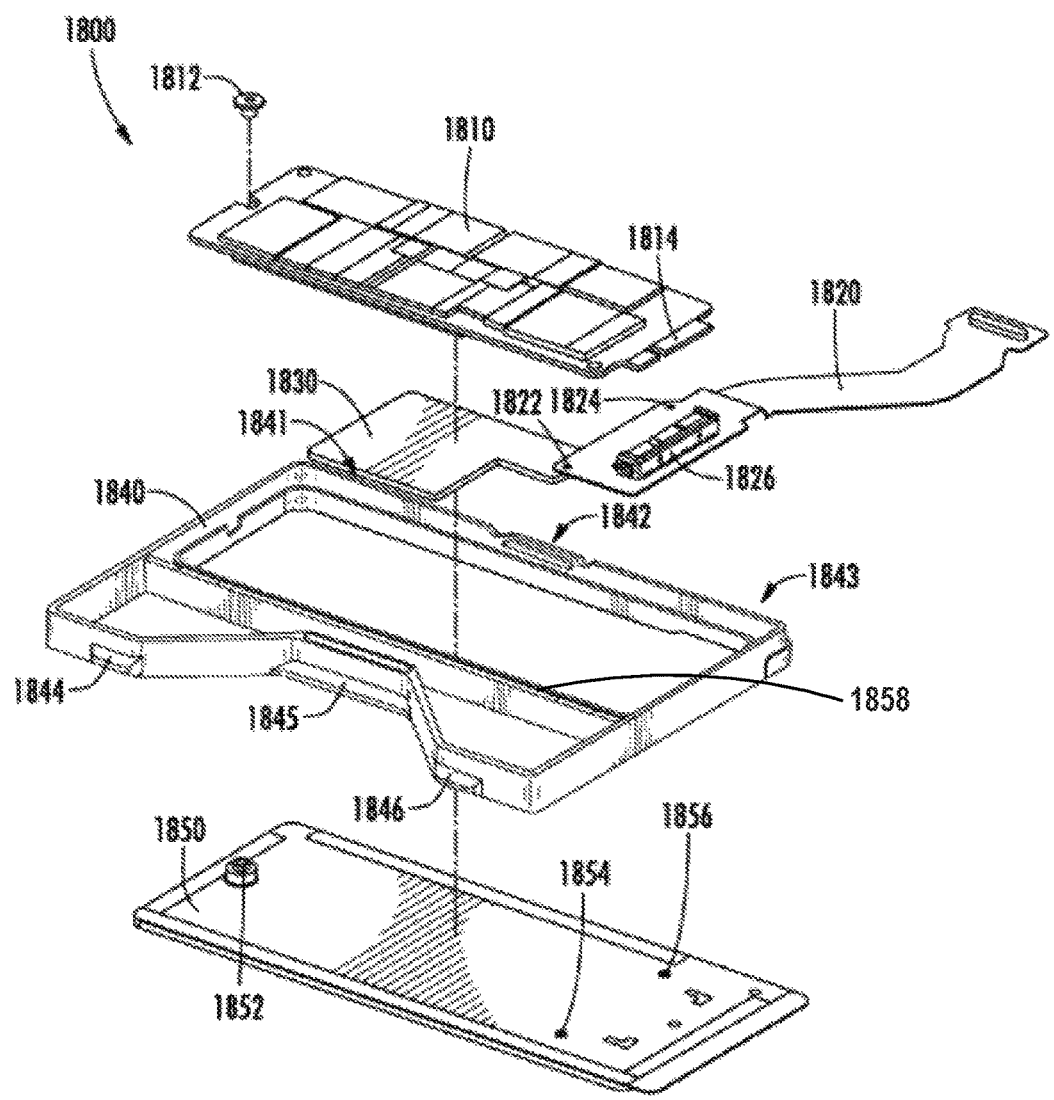
FIG. 18 illustrates a removable assembly for mounting a mass storage device in the compartment of the top case of FIG. 17 according to an example embodiment of the present disclosure.

FIG. 18 illustrates an example embodiment of a removable assembly 1800 for mounting a mass storage device in the compartment 1040 of the top case 106, 306. In one embodiment, the mass storage device can be a solid state drive (SSD). Assembly 1800 is made up of the following components: a solid state drive (SSD) card 1810, a connector assembly 1820, a thermal interface pad 1830, a bracket 1840, and an aluminum plate 1850. The solid state drive (SSD) card 1810 consists of solid state memory devices positioned on a circuit board. In one embodiment, the solid state drive (SSD) card 1810 is a double sided card, where solid state memory devices are positioned on both sides of the circuit board. In another embodiment, the solid state drive (SSD) card 1810 is a single sided card, where solid state memory devices are only positioned on one side of the circuit board. The connector assembly or flex 1820 connects the solid state drive (SSD) card 1810 to other devices in the portable computing device. This connection is completed by sliding card edge connector 1814 of the SSD card, which consists of open pads, into a right angle connector 1826 of the connector assembly 1820. Card edge connector 1814 can be positioned to be on one end of the solid state drive (SSD) card 1810 as shown in FIG. 18. Solid state drive (SSD) card 1810 is attached to aluminum plate 1850 by fastening screw 1812 into nut 1852 which is affixed to the aluminum plate 1850. As the solid state drive (SSD) card 1810 can get hot from usage, a thermal interface pad 1830 is used to help conduct heat from solid state drive (SSD) card 1810 to the aluminum plate 1850. The thermal interface pad 1830 is a thermal conducting material placed between the SSD card 1810 and the aluminum plate 1850. The aluminum plate 1850 is attached to plastic bracket 1840 using VHB (very high bond) tape, which is a high-strength double-sided adhesive tape. Alignment of the SSD card 1810 relative to the aluminum plate 1850 is achieved by passing pins 1854 and 1856 through holes 1822 and 1824 on the connector assembly 1820. Pins 1854 and 1865 are attached to the aluminum plate 1850, while the solid state drive (SSD) card 1810 is connected to the connector assembly 1820 via card edge connectors 1814.

Bracket 1840 is a single piece plastic frame configured for snap lock into compartment 1040 of the top case 106, 306 and snap release from compartment 1040. In order to snap lock bracket 1840 into compartment 1040, hook structure 1842 and locating features 1841 and 1843 of bracket 1840 are first lodged into holes 1022, 1020 and 1024, respectively, of compartment 1040. Bracket 1840 is then pushed down on the other side (i.e., the side with snap beam 1845 and protruding features 1844 and 1846) to lock the bracket in place in compartment 1040. The locking occurs when protruding features 1844 and 1846 are lodged into holes 1026 and 1028, respectively, of compartment 1040 of the top case 106, 306. To snap release bracket 1840 from compartment 1040, snap beam section 1845 of bracket 1840 is pushed towards the center of bracket 1840. This releases protruding features 1844 and 1846 from holes 1026 and 1028, respectively, of compartment 1040. Then hook structure 1842 and locating features 1841 and 1843 are dislodged from holes 1022, 1020 and 1024, respectively, of compartment 1040, so that bracket 1840 can be removed from compartment 1040. In actual practice, pushing snap beam section 1845 towards the center can be accomplished by using the thumb and index finger to squeeze bracket 1840. The thumb will squeeze on snap beam section 1845, while the index finger will squeeze on the side wall section of compartment 1040 that is abutting the "hook structure 1842" side of bracket 1840. Please note that hook structure 1842 and locating features 1841 and 1843 of bracket 1840 can not be shown in FIG. 18, because they protrude out towards the side wall 1004 of compartment 1040, but their approximate locations on bracket 1840 are clearly labeled in FIG. 18.

Removable assembly 1800 achieves the goal of mounting an SSD card in portable computing devices without adding too much strain to the SSD card. A user can store all of his information on the SSD card, so, if the SSD card is damaged in any way, the user can lose all his information. Accordingly, removable assembly 1800 is constructed in a manner that protects the SSD card. Removable assembly 1800 sinks enough heat from the card, so it can be used at a certain capacity. To save space, removable assembly 1800 can be positioned to be adjacent to a trackpad (or touchpad). Accordingly, removable assembly 1800 can be configured to be mechanically decoupled from the trackpad using foam absorbers, so it does not affect operation of the trackpad. Removable assembly 1800 holds the SSD card in one place as a single integrated component and has features, such as hook structure 1842 and locating features 1841 and 1843, which help guide and position the bracket into the "snap lock" position in compartment 1040. Further, the bracket is designed in such a fashion that it can not be broken by the snap release process, since the snap beam can only be pushed in for a limited distance, until the snap beam is stopped by the plastic retaining wall 1858 for the SSD card. In other words, the user can not over compress the bracket during the snap release process and break the bracket. The bracket also has enough mechanical structure along the length of the bracket (i.e., the longer side of the bracket, extending from locating feature 1841 to locating feature 1843), so that removable assembly 1800 is not deformable along that axis.

Figure 19:
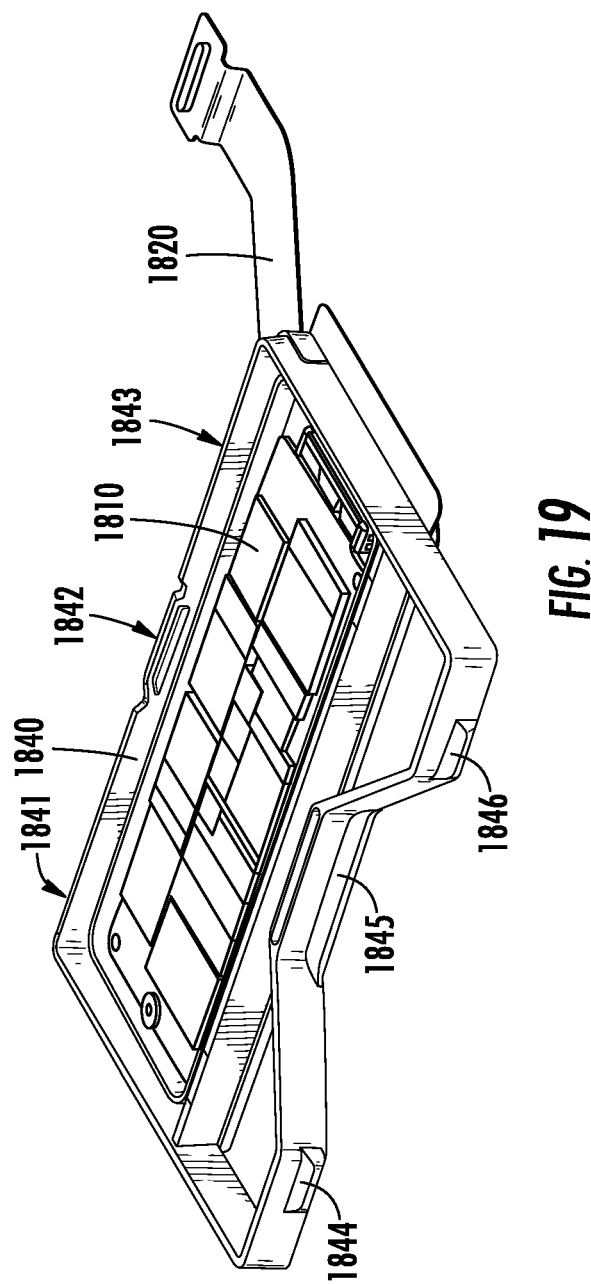
FIG. 19 illustrates the removable assembly of FIG. 18 with all components assembled together, ready for insertion into the compartment of the top case of FIG. 17, according to an example embodiment of the present disclosure (note: with the solid state drive card facing upward and the aluminum plate facing downward)

FIG. 19 illustrates the removable assembly 1800 of FIG. 18 with all components (i.e., SSD card 1810, connector assembly 1820, thermal interface pad 1830, bracket 1840, and aluminum plate 1850) assembled together, ready for insertion into compartment 1040 of the top case 106, 306. In FIG. 18, assembly 1800 is shown with the solid state drive card 1810 facing upward and the aluminum plate 1850 facing downward.

Figure 20:
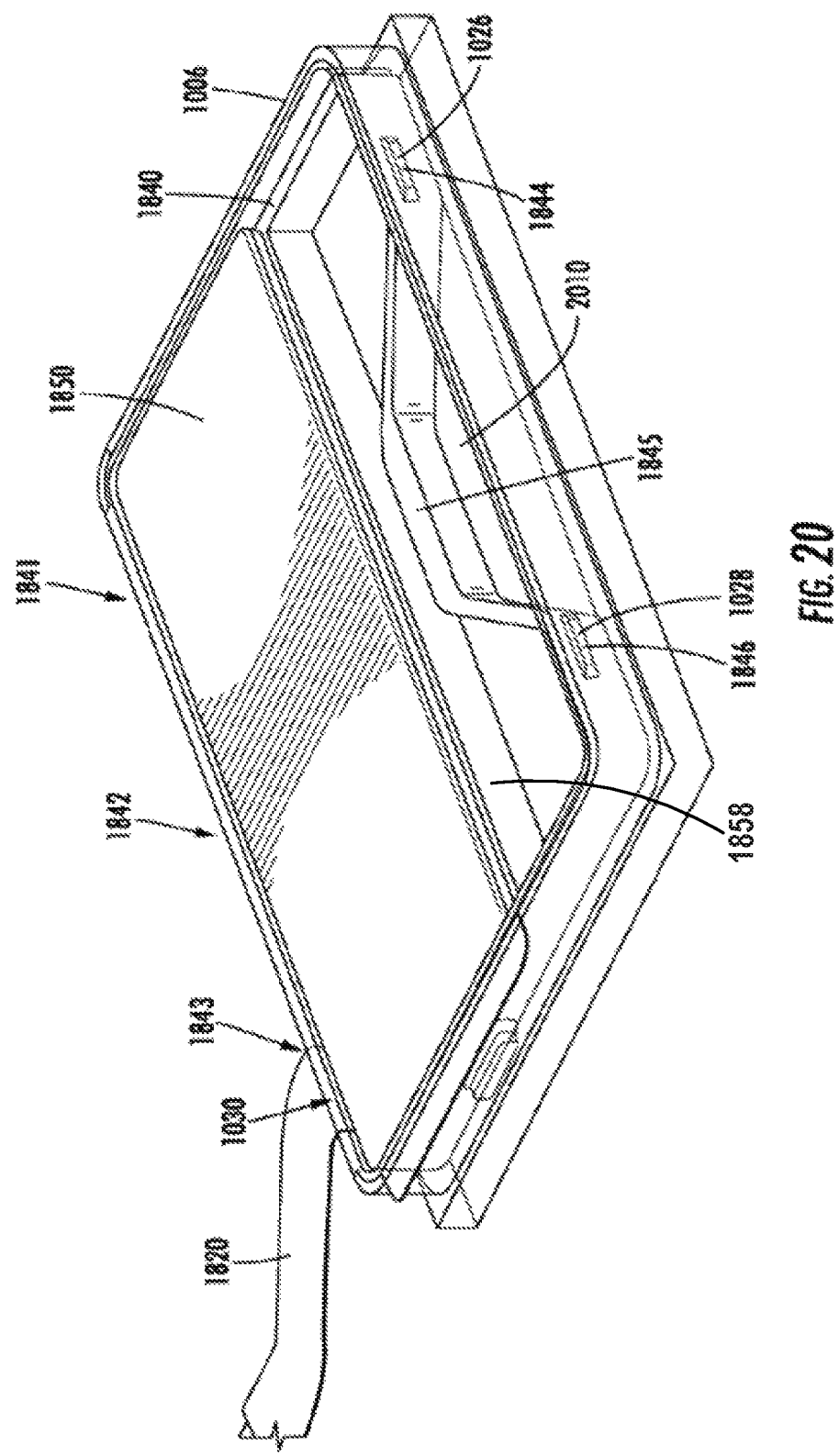
FIG. 20 illustrates the removable assembly of FIG. 18 after insertion in the compartment of the top case of FIG. 17 according to an example embodiment of the present disclosure (note: for insertion into the compartment of the top case, the removable assembly as shown in FIG. 19 has to be flipped over, so now the aluminum plate is facing upward and the solid state drive card is facing downward)

FIG. 20 illustrates the removable assembly 1800 of FIG. 18 after insertion in compartment 1040 of the top case 106, 306. Please note that for insertion into compartment 1040 of the top case, assembly 1800 as shown in FIG. 18 has to be flipped over, so that now the aluminum plate is facing upward and the solid state drive card is facing downward. Furthermore, FIG. 20 shows the embodiment where features 1020, 1022, 1024, 1026 and 1028 are depressions, instead of holes, located on the side walls of compartment 1040.

FIG. 20 shows both bracket 1840 of removable assembly 1800 and compartment 1040 of the top case 106, 306. FIG. 20 shows that bracket 1840 is snap locked into compartment 1040 by having protruding features 1844 and 1846 of bracket 1840 lodged into depressions 1026 and 1028, respectively, of compartment 1040. Additionally, it is harder to see, but hook structure 1842 and locating features 1841 and 1843 of bracket 1840 are also lodged into depressions 1022, 1020 and 1024, respectively, of compartment 1040. To snap release bracket 1840 from compartment 1040, a thumb can be inserted into gap 2010 to squeeze snap beam 1845 toward hook structure 1842, while an index finger squeezes on the side wall of compartment 1040 that is abutting the "hook structure 1842" side of bracket 1840. There is also a notch opening 1030 on one of the side walls of compartment 1040 that allows flex routing cable of connector assembly 1820 to exit from compartment 1040.

In different embodiments, snap beam section 1845 can be constructed to be of different distance from the plastic retaining wall 1858 for the SSD card, different thickness, and different width. Similarly, diagonal beams 1847 and 1848 can be constructed to be tilted by different angles relative to snap beam section 1845. Even though many different embodiments are possible, the following points are important factors to consider. First, the width of snap beam section 1845 should be sufficiently lame so that a thumb can easily squeeze it while positioned in gap 2010. Second, enough space should be provided to gap 2010, so that a thumb can be comfortably fitted within that space. Third, the distance between snap beam section 1845 and the plastic retaining wall 1858 for the SSD card should be large enough so that the bracket can be easily snap released, but it should be small enough so that pushing the snap beam section 1845 all the way to the plastic retaining wall 1858 for the SSD card will not cause the bracket to be broken due to extreme deformation. Fourth, snap beam section 1845 should be sufficiently thick to provide it structural strength, but sufficiently thin to accommodate for the previous three factors. Fifth, the angle of diagonal beams 1847 and 1848 relative to snap beam section 1845 should be such that the bracket can be easily snap released, while also accommodating for the previous four factors. The angle of diagonal beams 1847 and 1848 relative to snap beam section 1845 can also be made to match surrounding structures on the portable computing device for aesthetic reasons.

Figure 21:
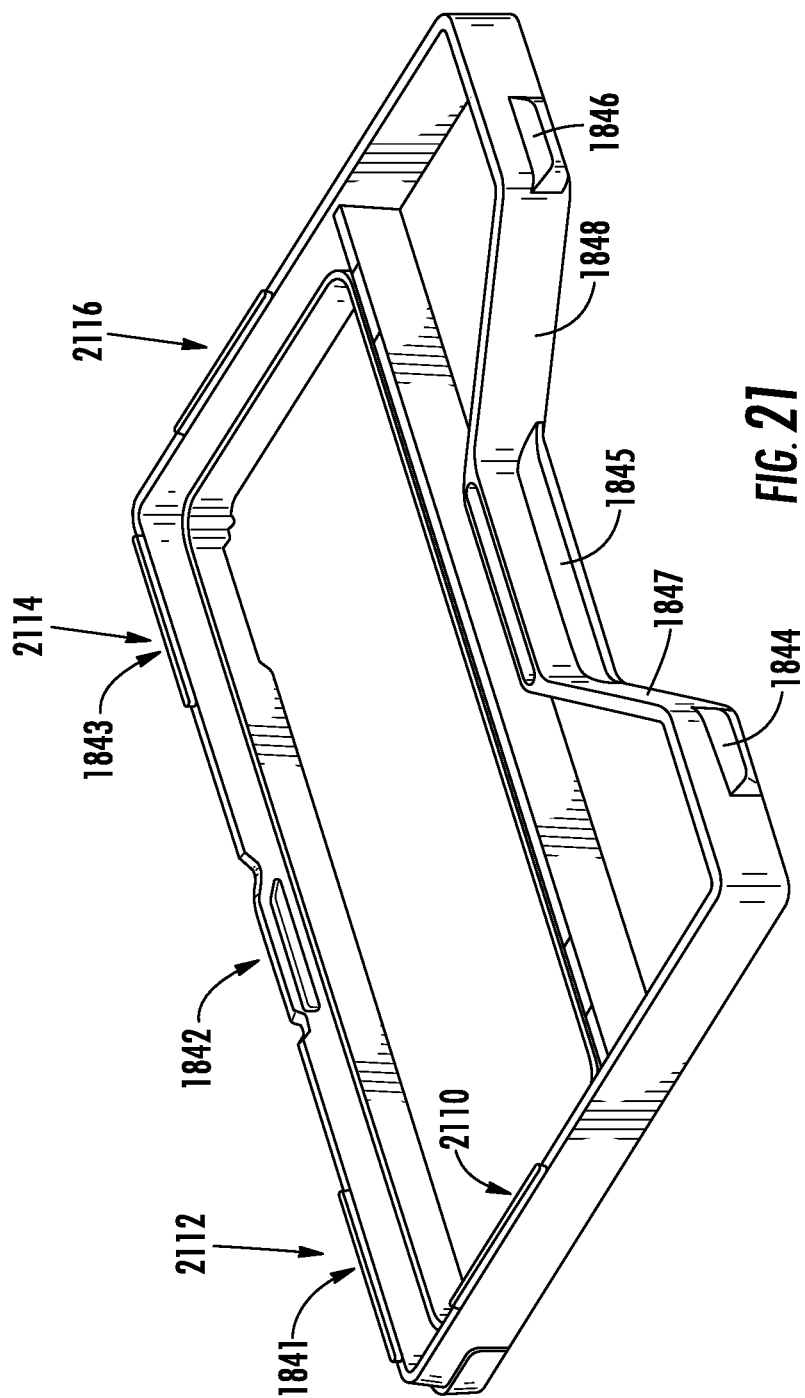
FIG. 21 illustrates a bracket belonging to the removable assembly of FIG. 18 according to an example embodiment of the present disclosure.

FIG. 21 illustrates bracket 1840 belonging to removable assembly 1800 of FIG. 18. In one embodiment, touchpad 116 can be positioned to be on the other side of compartment 1040, so that removable assembly 1800 is sitting under the touchpad (or trackpad) 116. Under these configurations, it is desirable for removable assembly 1800 not to affect the field of the touch pad, especially when the touchpad is pressed down. This can be accomplished by maintaining a nice even gap between bracket 1840 and controlling the "z-height" of the bracket 1840. Additionally, foam (e.g., open cell foam or closed cell foam) can be used to insulate the bracket 1840 and most importantly the SSD card 1810 from vibration. This insulation from vibration is especially useful when the SSD card is being snap lock into place and experiences vibration as it makes contact with the surface of the top case. In other embodiments, instead of foam, rubber or some other kind of elastomeric material can be used. FIG. 21 shows that four foam corner absorbers 2110, 2112, 2114 and 2116 can be used. These four foam corner absorbers can be made to be 12 mm long, 1 mm wide, and 0.50 mm thick. In another embodiment, additional foam absorbers can be placed on the diagonal beams 1847 and 1848, which is situated between the protruding features 1844, 1846 and snap beam 1845 of bracket 1840, as shown in FIG. 21. Additional foam absorbers can also be employed in mounting arrangements, but, if the foam absorber is employed to cover the entire bracket, then the foam absorbers can push back on the top case surface too much. Bending can occur and affect the touchpad, so it is not desirable to cover the entire bracket with foam.

Figure 22:
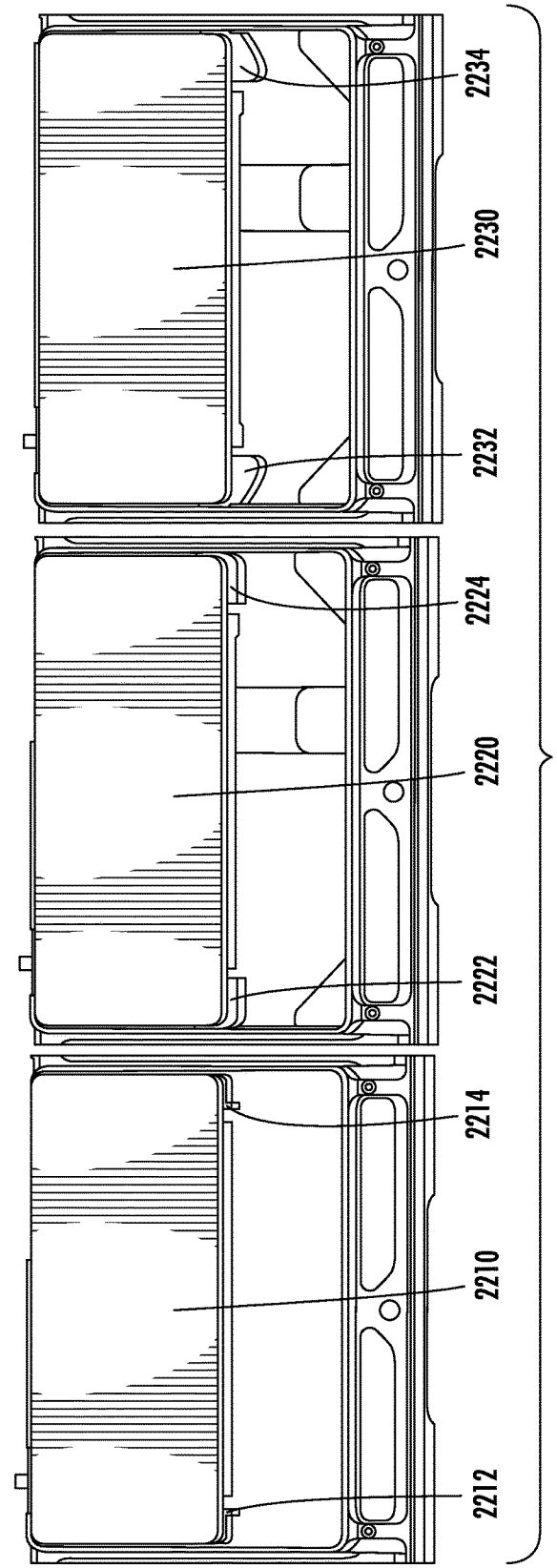
FIG. 22 illustrates three different snap mechanisms for a removable assembly for mounting a mass storage device in the compartment of the top case of FIG. 18 according to a second example embodiment of the present disclosure.

FIG. 22 illustrates three different snap mechanisms for a removable assembly for mounting a mass storage device in the compartment of the top case of FIG. 18 according to a second example embodiment of the present disclosure. In option 1, removable assembly 2210 can be snap released by pinching snap features 2212 and 2214 towards each other, thereby releasing locks to the two compartment side walls adjacent to the snap features 2212 and 2214. After the side locks have been released, removable assembly 2210 can be simply pulled out. In option 2, removable assembly 2220 can be snap released by pushing in snap features 2222 and 2224 towards the removable assembly 2220. Because the locking feature is hinged on the other end, pushing in the snap features will rotate the locking features out of their locked position, thereby disengaging the locking features from the compartment of the top case. Option 3 is similar to option 2, since snap features 2232 and 2234 also needs to be pushed in towards the removable assembly 2230 for snap release. The only difference is that the snap features 2232 and 2234 are shaped so that a user is forced to push the snap features in the direction they were designed for. In these embodiments, the removable assembly does not fill the whole space of the compartment of the top case.

Figure 23:
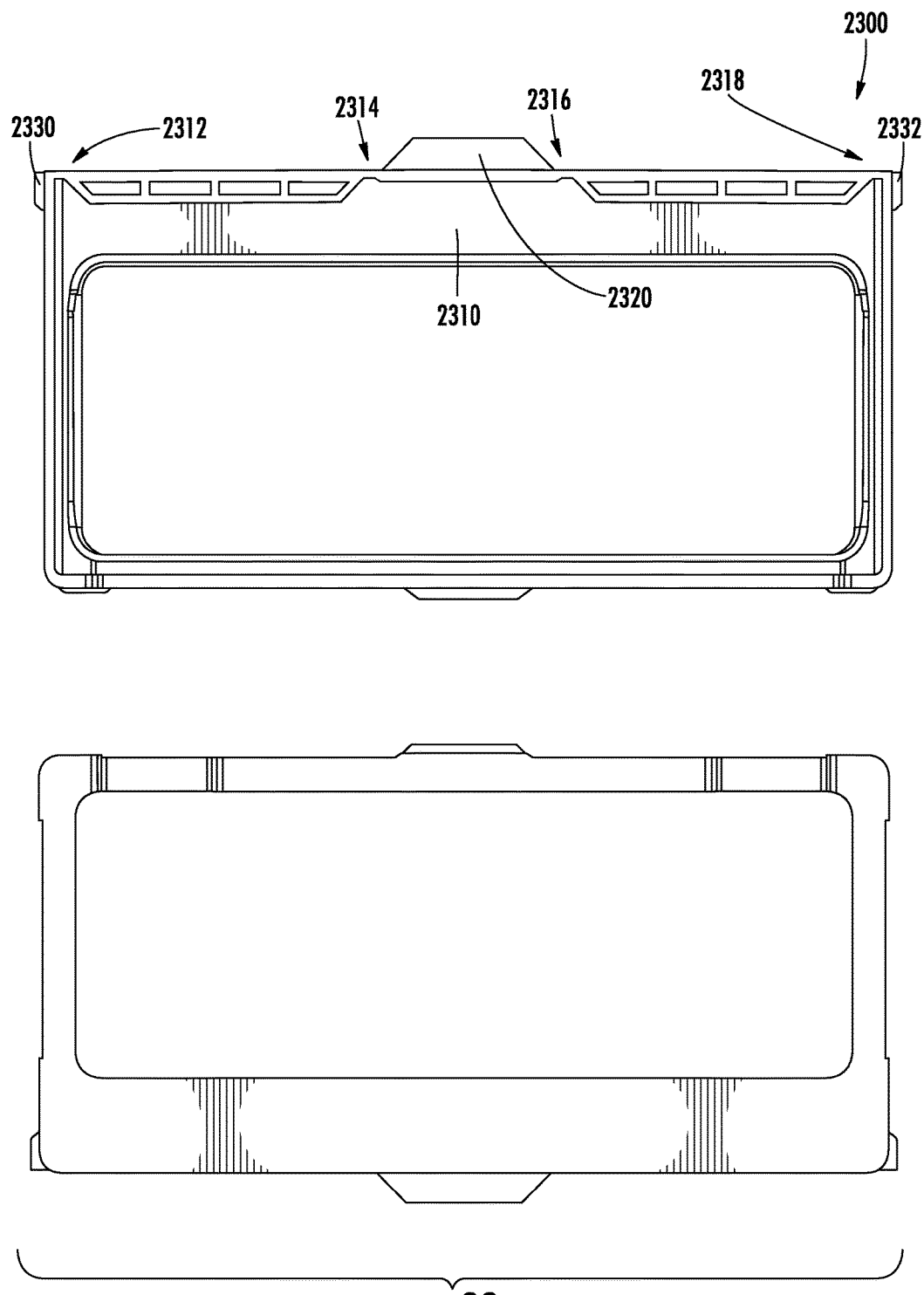
FIG. 23 illustrates a removable assembly for mounting a mass storage device in the compartment of the top case of FIG. 18 according to a third example embodiment of the present disclosure.

FIG. 23 illustrates a removable assembly 2300 for mounting a mass storage device in the compartment of the top case of FIG. 18 according to a third example embodiment of the present disclosure. In FIG. 23, beam 2310 of a removable assembly 2300 has certain areas thinned out so as to weaken the beam at those points and control the bending. When a downward force (i.e., toward the center of removable assembly 2300) is applied to beam 2310 at snap tab 2320, beam 2310 starts to bend downward, with thinned areas 2312, 2314, 2316 and 2318 behaving like hinges. The net result is that snap lock structures 2330 and 2332 are pulled inward to the snap tab 2320, effectively releasing the snap lock from the compartment.

Figure 24:
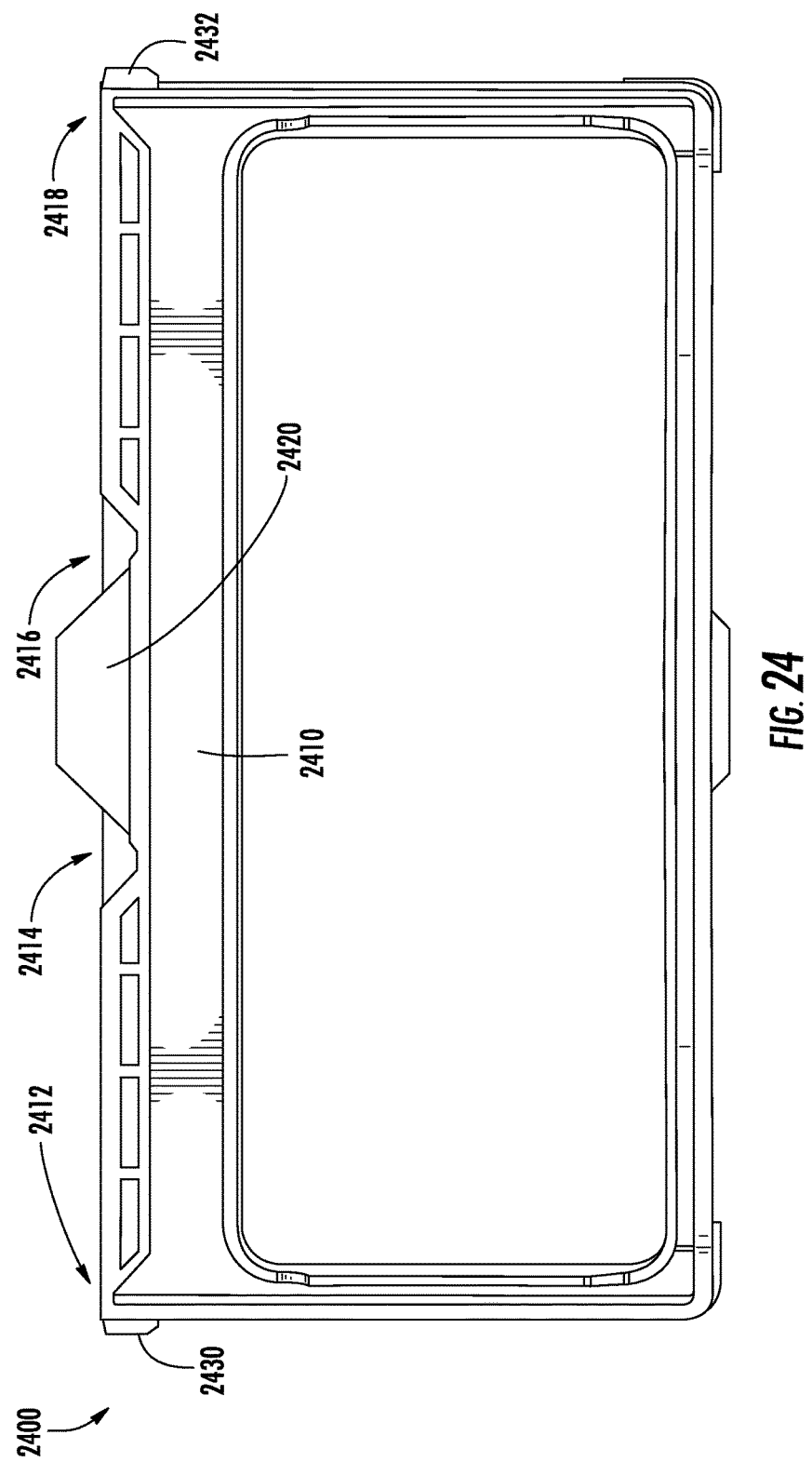
FIG. 24 illustrates a removable assembly for mounting a mass storage device in the compartment of the top case of FIG. 18 according to a fourth example embodiment of the present disclosure.

FIG. 24 illustrates a removable assembly 2400 for mounting a mass storage device in the compartment of the top case of FIG. 18 according to a fourth example embodiment of the present disclosure. Removable assembly 2400 is constructed very similar to removable assembly 2300 of previous FIG. 23, except that the thinning of beam 2410 at areas 2414 and 2416 occurs from the top, instead of from the bottom as is the case for corresponding areas in beam 2310 of previous FIG. 23. The advantage of this minor modification is that the living hinges at 2414 and 2416 are now guaranteed to be positioned below the axis formed by the living hinges at 2412 and 2418, so a downward force applied to beam 2410 at snap tab 2420 will cause bracket 2400 to collapse inward. This allows for easy snap lock and snap release. If, on the other hand, the living hinges at 2414 and 2416 are positioned to be above the axis formed by the living hinges at 2412 and 2418, then a downward force applied to beam 2410 at snap tab 2420 can cause bracket 2400 to collapse upward, making snap lock and snap release more difficult.

Figure 25:
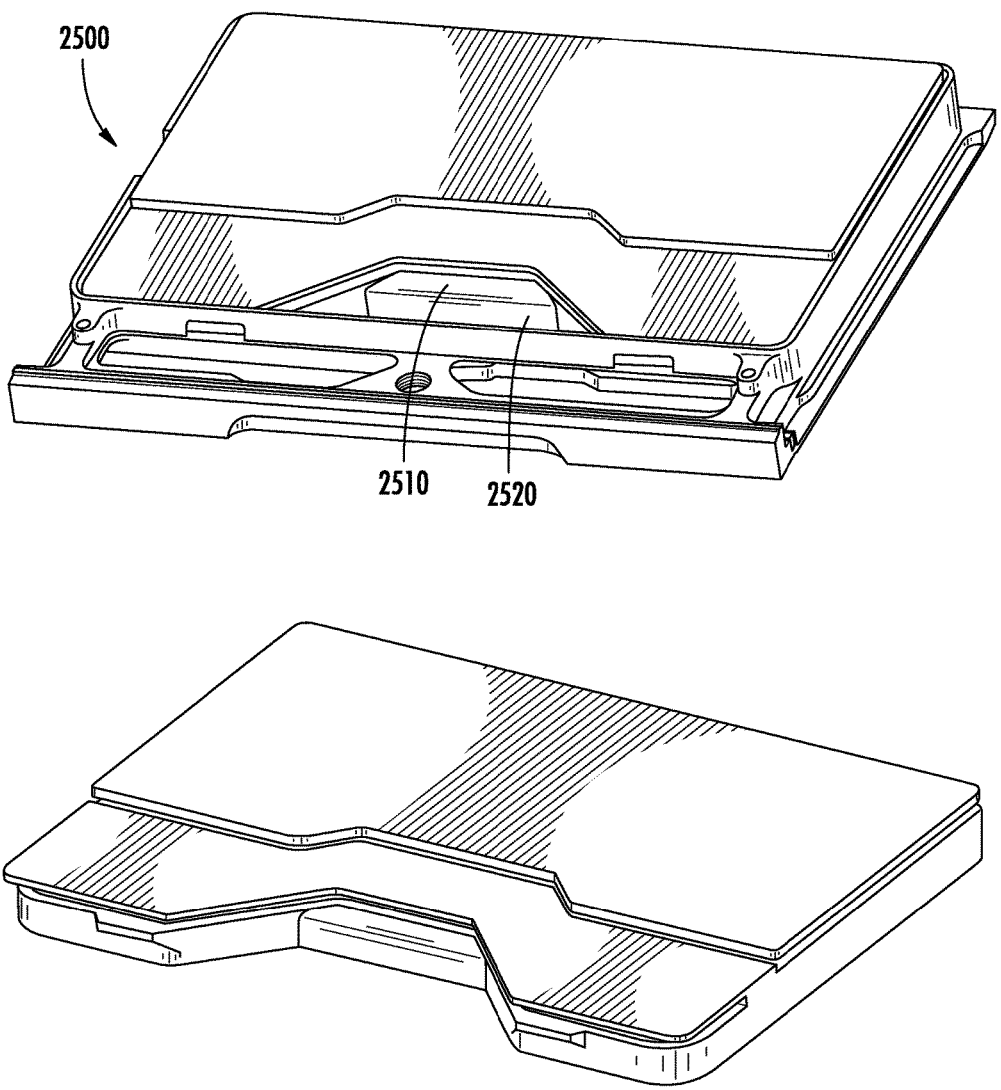
FIG. 25 illustrates a removable assembly for mounting a mass storage device in the compartment of the top case of FIG. 18 according to a fifth example embodiment of the present disclosure.

FIG. 25 illustrates a removable assembly 2500 for mounting a mass storage device in the compartment of the top case of FIG. 18 according to a fifth example embodiment of the present disclosure. In this embodiment, removable assembly 2500 fills the whole space of the compartment of the top case, except for a space 2520 to accommodate for a thumb. Snap release of removable assembly 2500 is achieved by using a thumb to press on front snap tab 2510.

Figure 26:
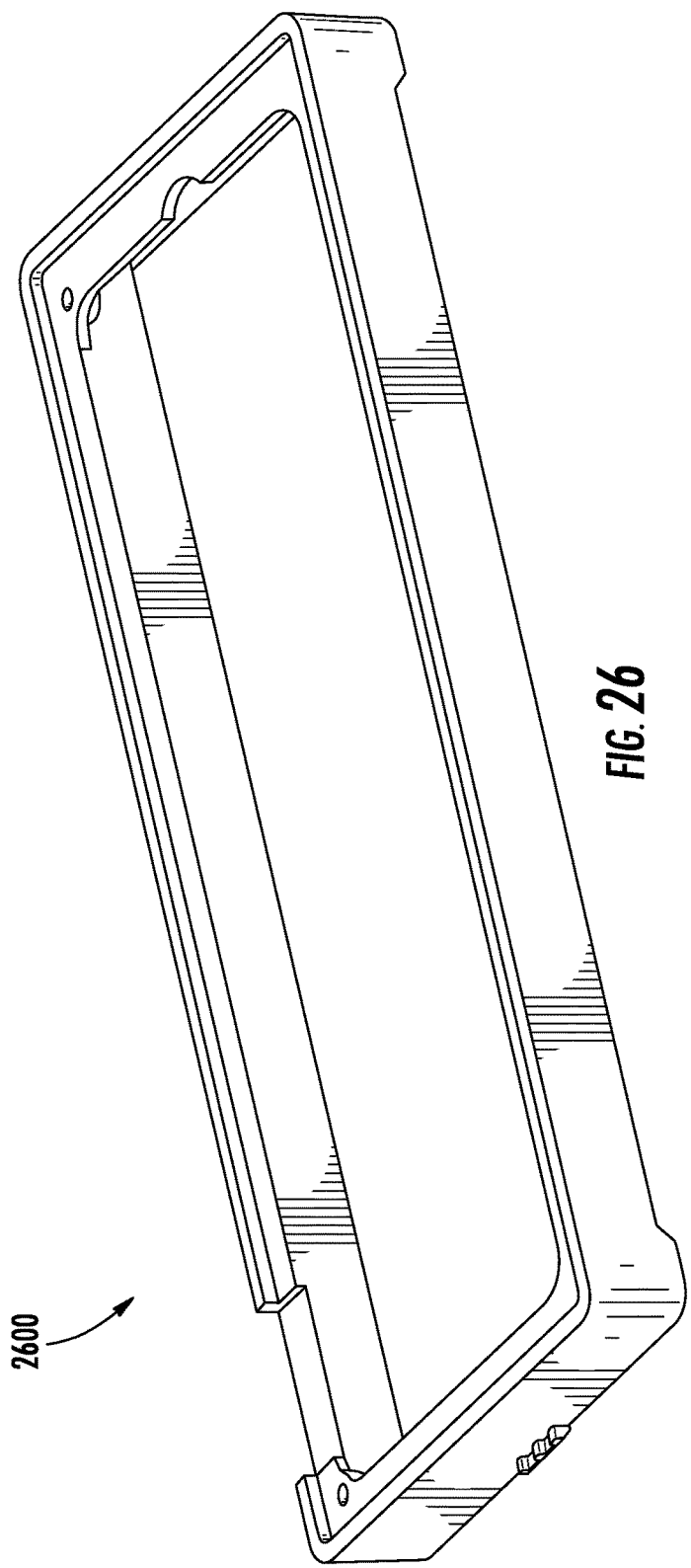
FIG. 26 illustrates a removable assembly for mounting a mass storage device in the compartment of the top case of FIG. 18 according to a sixth example embodiment of the present disclosure.

FIG. 26 illustrates a removable assembly 2600 for mounting a mass storage device in the compartment of the top case of FIG. 18 according to a sixth example embodiment of the present disclosure.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A single piece bracket assembly for carrying a memory storage device of a laptop computer, the laptop computer having a housing that includes a compartment defined by, in part, a first internal sidewall having a first opening and a second internal sidewall having a second opening, the single piece bracket assembly comprising:
   a first section defining a first internal volume enclosed by a first set of walls, the first internal volume having a size and shape to receive the memory storage device, the first section having a first wall that includes a securing structure such that, in a secured configuration, engages the first opening;
   a second section integrally formed with the first section, the second section defining a second internal volume enclosed by a second set of walls, the second set of walls comprising a second wall having a protrusion that engages the second opening in the secured configuration, the second wall further including a snap beam recessed with respect to the protrusion, the snap beam allowing removal of the first section and the second section from the compartment in an unsecured configuration; and
   a retaining wall parallel with respect to the first wall and the second wall, wherein movement of the snap beam toward the retaining wall causes the protrusion to disengage from the second opening.

2. The single piece bracket assembly of claim 1, wherein the second internal volume separates the protrusion and the snap beam from the retaining wall.

3. The single piece bracket assembly of claim 1, further comprising a second protrusion extending from the second wall, wherein the second wall further comprises:
   a first diagonal portion separating the protrusion from the snap beam,
   a second diagonal portion separating the second protrusion from the snap beam, wherein the snap beam is recessed with respect to the protrusion and the second protrusion based upon the first diagonal portion and the second diagonal portion.

4. The single piece bracket assembly of claim 3, wherein the securing structure comprises a hook extending outward from an external surface of the first wall, and wherein the hook secures in the opening of the first internal sidewall.

5. The single piece bracket assembly of claim 1, wherein the first section is fully enclosed by the first set of walls, and wherein the second section is fully enclosed by the second set of walls.

6. The single piece bracket assembly of claim 1, wherein the retaining wall limits movement of the snap beam.

7. The single piece bracket assembly of claim 1, wherein the first section and the second section define a single integrated component having multiple walls.

8. A bracket assembly for an electronic device, the bracket assembly comprising:
   a first section defining an internal volume fully enclosed by walls, the internal volume capable of receiving a mass storage device, the first section further comprising a first wall and a hook extending from the first wall and away from the internal volume, the hook releasably securing with the electronic device;
   a second section; and
   a second wall parallel with respect to the first wall and separating the first section from the second section, wherein the second section includes a second internal volume at least partially defined by:
      a first portion having a first protruding feature that releasably secures with the electronic device,
      a second portion having a second protruding feature that releasably secures with the electronic device, and
      a third portion between the first portion and the second portion, the third portion carrying a snap feature that releasably secures with the electronic device, wherein the snap feature is recessed with respect to the first portion and the second portion.

9. The bracket assembly of 8, wherein the first section combines with the second section to define a single integrated component that is removably coupled with the electronic device.

10. The bracket assembly of claim 8, wherein the first portion is continuously formed with the second portion, and wherein the second portion is continuously formed with the third portion.

11. The bracket assembly of claim 8, wherein the internal volume is defined by a four-sided structure, and wherein the second internal volume is defined by an eight-sided structure.

12. The bracket assembly of claim 8, wherein the first section comprises a first locating feature and a second locating feature, and wherein the first protruding feature, the second protruding feature, the first locating feature, and the second locating feature extend outward with respect to the internal volume.

13. The bracket assembly of claim 8, wherein the first portion, the second portion, and the third portion define a single wall of the second section, the single wall flexing in response to a force provided to the snap feature.

14. The bracket assembly of claim 13, wherein in response to the force, the single wall and the snap feature moves in a direction toward the second wall.

15. A bracket assembly for carrying a mass storage device in an electronic device, the bracket assembly comprising:
   a single integrated component that forms an enclosed internal volume having a size and shape to carry the mass storage device, the single integrated component comprising:
      a first wall having a first snap lock structure that extends from the first wall to secure with the electronic device;
      a second wall parallel with respect to the first wall, the second wall having a second snap lock structure that extends from the second wall to secure with the electronic device;
   a beam perpendicular to the first wall and the second wall, the beam comprising:
      a snap tab extending away from the enclosed internal volume,
      a first thinned region between the first snap lock structure and the snap tab, and
      a second thinned region between the second snap lock structure and the snap tab, wherein in response to a force to the beam, the beam hinges at the first thinned region and the second thinned region, thereby causing the first snap lock structure and the second snap lock structure to move in a direction toward the snap tab and away from the electronic device; and a third wall parallel respect to the beam, wherein the first wall, the second wall, the beam, and the third wall are integrally formed together to define the enclosed internal volume.

16. The bracket assembly of claim 15, wherein the beam further comprises third thinned region and a fourth thinned region, wherein in response to the force, the beam hinges at the third thinned region and the fourth thinned region.

17. The bracket assembly of claim 16, wherein the snap tab is positioned between the third thinned region and the fourth thinned region.

18. The bracket assembly of claim 17, wherein the fourth thinned region is positioned perpendicular with respect to the first wall and the second wall.

19. The bracket assembly of claim 16, wherein the beam includes a first thickness, and wherein each of the first thinned region, the second thinned region, the third thinned region, and the fourth thinned region includes a second thickness less than the first thickness.

20. The bracket assembly of claim 15, wherein in response to the force, the snap tap moves in a direction toward the enclosed internal volume.

\* \* \* \* \*